US012048036B2

(12) United States Patent
Vadapalli et al.

(10) Patent No.: US 12,048,036 B2
(45) Date of Patent: Jul. 23, 2024

(54) DUAL CONNECTIVITY UPLINK SCHEDULING A MULTI-SUBSCRIBER IDENTITY MODULE USER EQUIPMENT

(71) Applicant: QUALCOMM INCORPORATED, San Diego, CA (US)

(72) Inventors: Syam Pavan Vadapalli, Visakhapatnam (IN); AnkammaRao Ravuvari, Hyderabad (IN); Roop Sagar Inakollu, Nellore (IN); Parshu Ramulu Chintakindi, Hyderabad (IN)

(73) Assignee: QUALCOMM Incorporated, San Diego, CA (US)

( * ) Notice: Subject to any disclaimer, the term of this patent is extended or adjusted under 35 U.S.C. 154(b) by 276 days.

(21) Appl. No.: 17/500,124

(22) Filed: Oct. 13, 2021

(65) Prior Publication Data

US 2023/0112465 A1  Apr. 13, 2023

(51) Int. Cl.
*H04W 76/15* (2018.01)
*H04L 5/14* (2006.01)
*H04W 72/1263* (2023.01)
*H04W 72/21* (2023.01)

(52) U.S. Cl.
CPC ............... *H04W 76/15* (2018.02); *H04L 5/14* (2013.01); *H04W 72/1263* (2013.01); *H04W 72/21* (2023.01)

(58) Field of Classification Search
CPC . H04W 76/15; H04W 72/21; H04W 72/1263; H04L 5/14
USPC ......................................................... 370/329
See application file for complete search history.

(56) References Cited

U.S. PATENT DOCUMENTS

| 2013/0303181 A1* | 11/2013 | Rajurkar | H04W 72/0453 |
| | | | 455/452.1 |
| 2015/0117342 A1* | 4/2015 | Loehr | H04W 72/569 |
| | | | 370/329 |
| 2020/0275349 A1* | 8/2020 | Guo | H04W 56/003 |

\* cited by examiner

*Primary Examiner* — Chi Tang P Cheng
(74) *Attorney, Agent, or Firm* — Haynes and Boone, LLP

(57) ABSTRACT

Mechanisms for uplink (UL) scheduling in dual connectivity scenarios are provided. According to one aspect of the present disclosure, a method of wireless communication performed by a user equipment (UE) includes: receiving, in an uplink (UL) buffer, first UL data for transmission to at least one base station (BS) via a first path and a second path, wherein the first path and the second path are associated with a dual connectivity communication mode; transmitting, to a first BS on the first path, a first scheduling request for the first UL data; and refraining, based on a time duration between the receiving the first UL data in the buffer and a tune-away gap on the second path, from transmitting a second scheduling request for the first UL data on the second path.

28 Claims, 10 Drawing Sheets

DUAL CONNECTIVITY UPLINK SCHEDULING A MULTI-SUBSCRIBER IDENTITY MODULE USER EQUIPMENT

FIELD OF THE DISCLOSURE

Aspects of the present disclosure generally relate to wireless communication and to techniques and apparatuses for avoiding collisions between paging occasions of different subscriptions in a multi-subscriber identity module user equipment.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, and/or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long-Term Evolution (LTE). LTE/LTE-Advanced is a set of enhancements to the Universal Mobile Telecommunications System (UMTS) mobile standard promulgated by the Third Generation Partnership Project (3GPP).

A wireless communication network may include a number of base stations (BSs) that can support communication for a number of user equipment (UEs). A user equipment (UE) may communicate with a base station (BS) via the downlink and uplink. The downlink (or forward link) refers to the communication link from the BS to the UE, and the uplink (or reverse link) refers to the communication link from the UE to the BS. As will be described in more detail herein, a BS may be referred to as a Node B, a gNB, an access point (AP), a radio head, a transmit receive point (TRP), a New Radio (NR) BS, a 5G Node B, and/or the like.

The above multiple access technologies have been adopted in various telecommunication standards to provide a common protocol that enables different user equipment to communicate on a municipal, national, regional, and even global level. New Radio (NR), which may also be referred to as 5G, is a set of enhancements to the LTE mobile standard promulgated by the Third Generation Partnership Project (3GPP). NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. However, as the demand for mobile broadband access continues to increase, there exists a need for further improvements in LTE and NR technologies, including those applicable to other multiple access technologies and the telecommunication standards that employ these technologies.

SUMMARY

The following summarizes some aspects of the present disclosure to provide a basic understanding of the discussed technology. This summary is not an extensive overview of all contemplated features of the disclosure and is intended neither to identify key elements of all aspects of the disclosure nor to delineate the scope of any or all aspects of the disclosure. Its sole purpose is to present some concepts of one or more aspects of the disclosure in summary form as a prelude to the more detailed description that is presented later.

According to one aspect of the present disclosure, method of wireless communication performed by a user equipment (UE) includes: receiving, in an uplink (UL) buffer, first UL data for transmission to at least one base station (BS) via a first path and a second path, wherein the first path and the second path are associated with a dual connectivity communication mode; transmitting, to a first BS on the first path, a first scheduling request for the first UL data; and refraining, based on a time duration between the receiving the first UL data in the buffer and a tune-away gap on the second path, from transmitting a second scheduling request for the first UL data on the second path.

According to another aspect of the present disclosure, a user equipment (UE) includes: a memory; a transceiver; and at least one processor operatively coupled to the memory. The processor may be configured to: receive, in an uplink (UL) buffer, first UL data for transmission to at least one base station (BS) via a first path and a second path, wherein the first path and the second path are associated with a dual connectivity communication mode; transmit, to a first BS on the first path, a first scheduling request for the first UL data; and refrain, based on a time duration between the receiving the first UL data in the buffer and a tune-away gap on the second path, from transmitting a second scheduling request for the first UL data on the second path.

According to another aspect of the present disclosure, a non-transitory, computer readable medium has program code recorded thereon. The program code is executable by a user equipment (UE) and comprises code for causing the UE to: receive, in an uplink (UL) buffer, first UL data for transmission to at least one base station (BS) via a first path and a second path, wherein the first path and the second path are associated with a dual connectivity communication mode; transmit, to a first BS on the first path, a first scheduling request for the first UL data; and refrain, based on a time duration between the receiving the first UL data in the buffer and a tune-away gap on the second path, from transmitting a second scheduling request for the first UL data on the second path.

According to another aspect of the present disclosure, a user equipment (UE) includes: means for receiving, in an uplink (UL) buffer, first UL data for transmission to at least one base station (BS) via a first path and a second path, wherein the first path and the second path are associated with a dual connectivity communication mode; means for transmitting, to a first BS on the first path, a first scheduling request for the first UL data; and means for refraining, based on a time duration between the receiving the first UL data in the buffer and a tune-away gap on the second path, from transmitting a second scheduling request for the first UL data on the second path.

Aspects generally include a method, apparatus, system, computer program product, non-transitory computer-readable medium, user equipment, base station, wireless communication device, and/or processing system as substantially described herein with reference to and as illustrated by the accompanying drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Figure 1:
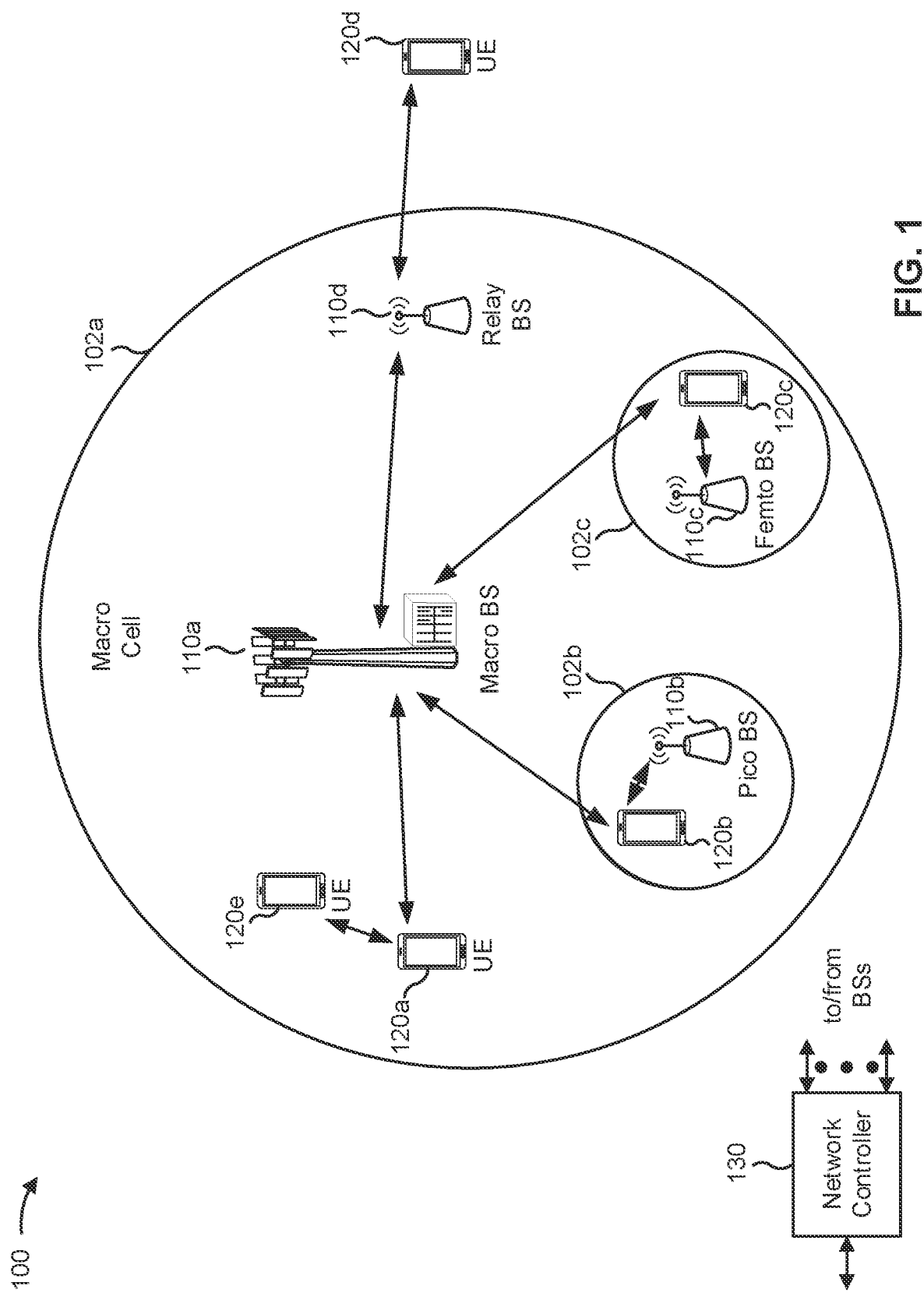
FIG. 1 is a diagram illustrating an example of a wireless communication network, in accordance with various aspects of the present disclosure.

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, and/or the like (collectively referred to as "elements"). These elements may be implemented using hardware, software, or combinations thereof. Whether such elements are implemented as hardware or software depends upon the particular application and design constraints imposed on the overall system.

It should be noted that while aspects may be described herein using terminology commonly associated with 3G and/or 4G wireless technologies, aspects of the present disclosure can be applied in other generation-based communication systems, such as 5G and later, including NR technologies.

In some aspects, a multi-subscriber identity module (MSIM) wireless communication device may be configured to communicate with one or more networks using two or more subscriptions. For example, an MSIM user equipment (UE) may be configured to communicate with the one or more networks using a dedicated data subscription (DDS) and a non-dedicated data subscription (n-DDS). The DDS may be used for receiving data services from the network in an active or connected mode, while the n-DDS may be used in an idle mode and may be used for periodically monitoring for paging messages to conserve power. For example, the n-DDS may be configured to periodically monitor during one or more paging occasions. The MSIM UE may be configured with tune-away gaps for the DDS during the n-DDS paging occasions to avoid potential collisions while the MSIM UE is in connected mode on the DDS. In some instances, the tune-away gaps may result in baseband conflicts. Accordingly, the DDS may experience an outage for scheduling downlink (DL) communications and uplink (UL) communications.

Further, in some aspects, the MSIM UE may be configured, on one or both subscriptions, with dual connectivity. For example, the DDS may be configured with standalone or non-standalone dual connectivity. Standalone (SA) dual connectivity may refer to dual communication paths the UE may maintain with two nodes (e.g., BSs) or two cells associated with a same radio access technology (RAT). For example, a UE configured with dual connectivity communications may be configured to communicate with two different NR communication paths. In some aspects, SA dual connectivity may include communicating with a same BS on two different frequency bands. For example, the UE may communicate with an NR BS on a first frequency band in a FR2 or mmWave frequency (e.g., >24 GHz) and on a second frequency band in a FR1 frequency (e.g., 3.7 GHz). In other aspects, SA dual connectivity may include communicating with different BSs in a same frequency band, or in different frequency bands. Non-standalone (NSA) dual connectivity may refer to dual communication paths the UE maintains with two nodes or cells associated with different RATs, such as an LTE node and a NR node. In some aspects, NSA dual connectivity may include communicating with a same node (e.g., BS), but using different RATs. For example, in some aspects, a dual connectivity UE may be configured to communicate with a NSA BS using LTE for a first communication path, and NR for a second communication path. In some aspects, one of the paths may be referred to as a primary path, and the other path may be referred to as a secondary path. For example, in NSA dual connectivity, an LTE connection may be the primary path and an NR connection may be the secondary path. In some instances, the nodes (e.g., BSs) for each communication path used by the MSIM UE for SA dual connectivity or NSA dual connectivity may be part of, or in communication with, a same core network. The dual connectivity configuration may be a radio-link control (RLC)-level configuration. In this regard, in some instances the network and UE may maintain the different data paths using independent physical layer resources and/or protocols.

In a dual connectivity scenario, UL data may arrive in a buffer of the UE. If the amount of data in the buffer exceeds a threshold (e.g., UL-DataSplitThreshold or other data size threshold), the UE may trigger and/or transmit a scheduling request for each connection path. Based on the scheduling requests, the network may transmit UL grants for each of the primary path and the secondary path. In some instances, the network transmits the UL grants via downlink control information (DCI). The UE may transmit, over one or both of the communication paths, a buffer status report (BSR) indicating a volume or amount of data in the buffer. The UE may also transmit at least a portion of the data in the UL buffer with the BSR. The UE may transmit the BSR and the portion of the UL data in a physical uplink shared channel (PUSCH). Based on the scheduling requests and the BSR, the network may transmit, on one or both of the communication paths, an additional UL grant indicating time and frequency resources for the UE to transmit the remaining UL data in the buffer. In some instances, the network transmits the indication of the time and frequency resources for the UE to transmit the remaining UL data in the buffer via DCI.

As mentioned above, the UE may trigger scheduling requests for both communication paths based on the UL data in the buffer exceeding the threshold. However, in some instances, the UE may experience an UL transmission outage on communication path associated with one subscription (e.g., a DDS subscription) during a tune-away gap associated with a paging occasion of another subscription (e.g., an n-DDS subscription). If the UL transmission outage overlaps with the scheduled time domain resources of the dual connectivity subscription (e.g., DDS), then the UE may not be able to transmit the scheduled UL data on at least one of the communication paths. The interrupted UL dual communication UL transmission may result in increased block error ratio (BLER) and/or throughput loss. In some aspects, the interruption in the UL transmission may result in unrecoverable errors.

The present disclosure describes schemes and mechanisms for dual connectivity UL scheduling for MSIM wireless communication devices. In one aspect, a MSIM UE receives UL data in a buffer for communication in a first communication path and a second communication path. The amount of UL data in the buffer may exceed an UL buffer threshold. Based on the UL data exceeding the UL buffer threshold, the UE may determine to transmit scheduling requests via each of the dual connectivity communication paths. In one aspect, the UE may determine if a tune-away gap is scheduled for one or both of the communication paths. The tune-away gap may be based on a scheduled paging occasion on a subscription of the MSIM UE. For example, the UE may be configured with the dual connectivity communications on a DDS (i.e., both communication paths are via the DDS), and the UE may be configured to monitor for paging messages on a n-DDS. In some instances, the tune-away gap may result in an outage of only one of the communication paths on the DDS. If the MSIM UE determines that a tune-away gap is scheduled within predetermined amount of time (e.g., x milliseconds) of receiving the UL data in the buffer, the MSIM UE may transmit a scheduling request only on the communication path that is not affected by the tune-away gap. For example, if the tune-away gap will result in an UL transmission outage on a secondary communication path, the MSIM UE may transmit the scheduling request on the primary communication path, and refrain from transmitting the scheduling request on the secondary communication path. That is, the MSIM UE may transmit the scheduling request only on the primary communication path. Accordingly, the MSIM UE may preempt triggering an UL grant that could be thwarted by a tune-away gap-related UL transmission outage.

Aspects of the present disclosure provide many advantages. For example, by preempting an UL scheduling request that may be canceled or obstructed by a tune-away outage, the number of errors in MSIM dual connectivity communications may be reduced. The reduction in errors may result in reduced latency, increased UL throughput, greater reliability, more efficient use of network resources, and/or reduced power consumption by both UEs and BSs.

FIG. 1 illustrates a wireless communication network 100 according to some aspects of the present disclosure. The network 100 may be a 5G network. The network 100 includes a number of base stations (BSs) 110 (individually labeled as 110a, 110b, 110c, 110d, 110e, and 110f) and other network entities. A BS 110 may be a station that communicates with UEs 120 and may also be referred to as an evolved node B (eNB), a next generation eNB (gNB), an access point, and the like. Each BS 110 may provide communication coverage for a particular geographic area. In 3GPP, the term "cell" can refer to this particular geographic coverage area of a BS 110 and/or a BS subsystem serving the coverage area, depending on the context in which the term is used.

A BS 110 may provide communication coverage for a macro cell or a small cell, such as a pico cell or a femto cell, and/or other types of cell. A macro cell generally covers a relatively large geographic area (e.g., several kilometers in radius) and may allow unrestricted access by UEs with service subscriptions with the network provider. A small cell, such as a pico cell, would generally cover a relatively smaller geographic area and may allow unrestricted access by UEs with service subscriptions with the network provider. A small cell, such as a femto cell, would also generally cover a relatively small geographic area (e.g., a home) and, in addition to unrestricted access, may also provide restricted access by UEs having an association with the femto cell (e.g., UEs in a closed subscriber group (CSG), UEs for users in the home, and the like). A BS for a macro cell may be referred to as a macro BS. A BS for a small cell may be referred to as a small cell BS, a pico BS, a femto BS or a home BS. In the example shown in FIG. 1, the BSs 110d and 110e may be regular macro BSs, while the BSs 110a-110c may be macro BSs enabled with one of three dimension (3D), full dimension (FD), or massive MIMO. The BSs 110a-110c may take advantage of their higher dimension MIMO capabilities to exploit 3D beamforming in both elevation and azimuth beamforming to increase coverage and capacity. The BS 110f may be a small cell BS which may be a home node or portable access point. A BS 110 may support one or multiple (e.g., two, three, four, and the like) cells.

The network 100 may support synchronous or asynchronous operation. For synchronous operation, the BSs may have similar frame timing, and transmissions from different BSs may be approximately aligned in time. For asynchronous operation, the BSs may have different frame timing, and transmissions from different BSs may not be aligned in time.

The UEs 120 are dispersed throughout the wireless network 100, and each UE 120 may be stationary or mobile. A UE 120 may also be referred to as a terminal, a mobile station, a subscriber unit, a station, or the like. A UE 120 may be a cellular phone, a personal digital assistant (PDA), a wireless modem, a wireless communication device, a handheld device, a tablet computer, a laptop computer, a cordless phone, a wireless local loop (WLL) station, or the like. In one aspect, a UE 120 may be a device that includes a Universal Integrated Circuit Card (UICC). In another aspect, a UE may be a device that does not include a UICC. In some aspects, the UEs 120 that do not include UICCs may also be referred to as IoT devices or internet of everything (IoE) devices. The UEs 120a-120d are examples of mobile smart phone-type devices accessing network 100. A UE 120 may also be a machine specifically configured for connected communication, including machine type communication (MTC), enhanced MTC (eMTC), narrowband IoT (NB-IoT) and the like. The UEs 120e-120h are examples of various machines configured for communication that access the network 100. The UEs 120i-120k are examples of vehicles equipped with wireless communication devices configured for communication that access the network 100. A UE 120 may be able to communicate with any type of the BSs, whether macro BS, small cell, or the like. In FIG. 1, a lightning bolt (e.g., communication links) indicates wireless transmissions between a UE 120 and a serving BS 110, which is a BS designated to serve the UE 120 on the downlink (DL) and/or uplink (UL), desired transmission between BSs 110, backhaul transmissions between BSs, or sidelink transmissions between UEs 120.

In operation, the BSs 110a-110c may serve the UEs 120a and 120b using 3D beamforming and coordinated spatial techniques, such as coordinated multipoint (CoMP) or multi-connectivity. The macro BS 110d may perform backhaul communications with the BSs 110a-110c, as well as small cell, the BS 110f. The macro BS 110d may also transmit multicast services which are subscribed to and received by the UEs 120c and 120d. Such multicast services may include mobile television or stream video, or may include other services for providing community information, such as weather emergencies or alerts, such as Amber alerts or gray alerts.

The BSs 110 may also communicate with a core network. The core network may provide user authentication, access authorization, tracking, Internet Protocol (IP) connectivity, and other access, routing, or mobility functions. At least some of the BSs 110 (e.g., which may be an example of a gNB or an access node controller (ANC)) may interface with the core network through backhaul links (e.g., NG-C, NG-U, etc.) and may perform radio configuration and scheduling for communication with the UEs 120. In various examples, the BSs 110 may communicate, either directly or indirectly (e.g., through core network), with each other over backhaul links (e.g., X1, X2, etc.). The backhaul links may be wired or wireless communication links.

The network 100 may also support communications with ultra-reliable and redundant links for devices, such as the UE 120e, which may be a drone. Redundant communication links with the UE 120e may include links from the macro BSs 110d and 110e, as well as links from the small cell BS 110f. Other machine type devices, such as the UE 120f (e.g., a thermometer), the UE 120g (e.g., smart meter), and UE 120h (e.g., wearable device) may communicate through the network 100 either directly with BSs, such as the small cell BS 110f, and the macro BS 110e, or in multi-step-size configurations by communicating with another user device which relays its information to the network, such as the UE 120f communicating temperature measurement information to the smart meter, the UE 120g, which is then reported to the network through the small cell BS 110f. The network 100 may also provide additional network efficiency through dynamic, low-latency TDD/FDD communications, such as V2V, V2X, C-V2X communications between a UE 120i, 120j, or 120k and other UEs 120, and/or vehicle-to-infrastructure (V2I) communications between a UE 120i, 120j, or 120k and a BS 110.

In some implementations, the network 100 utilizes OFDM-based waveforms for communications. An OFDM-based system may partition the system BW into multiple (K) orthogonal subcarriers, which are also commonly referred to as subcarriers, tones, bins, or the like. Each subcarrier may be modulated with data. In some instances, the subcarrier spacing between adjacent subcarriers may be fixed, and the total number of subcarriers (K) may be dependent on the system BW. The system BW may also be partitioned into subbands. In other instances, the subcarrier spacing and/or the duration of TTIs may be scalable.

In some aspects, the BSs 110 can assign or schedule transmission resources (e.g., in the form of time-frequency resource blocks (RB)) for downlink (DL) and uplink (UL) transmissions in the network 100. DL refers to the transmission direction from a BS 110 to a UE 120, whereas UL refers to the transmission direction from a UE 120 to a BS 110. The communication can be in the form of radio frames. A radio frame may be divided into a plurality of subframes or slots, for example, about 10. Each slot may be further divided into mini-slots. In a FDD mode, simultaneous UL and DL transmissions may occur in different frequency bands. For example, each subframe includes an UL subframe in an UL frequency band and a DL subframe in a DL frequency band. In a TDD mode, UL and DL transmissions occur at different time periods using the same frequency band. For example, a subset of the subframes (e.g., DL subframes) in a radio frame may be used for DL transmissions and another subset of the subframes (e.g., UL subframes) in the radio frame may be used for UL transmissions.

The DL subframes and the UL subframes can be further divided into several regions. For example, each DL or UL subframe may have pre-defined regions for transmissions of reference signals, control information, and data. Reference signals are predetermined signals that facilitate the communications between the BSs 110 and the UEs 120. For example, a reference signal can have a particular pilot pattern or structure, where pilot tones may span across an operational BW or frequency band, each positioned at a pre-defined time and a pre-defined frequency. For example, a BS 110 may transmit cell specific reference signals (CRSs) and/or channel state information-reference signals (CSI-RSs) to enable a UE 120 to estimate a DL channel. Similarly, a UE 120 may transmit sounding reference signals (SRSs) to enable a BS 110 to estimate an UL channel. Control information may include resource assignments and protocol controls. Data may include protocol data and/or operational data. In some aspects, the BSs 110 and the UEs 120 may communicate using self-contained subframes. A self-contained subframe may include a portion for DL communication and a portion for UL communication. A self-contained subframe can be DL-centric or UL-centric. A DL-centric subframe may include a longer duration for DL communication than for UL communication. A UL-centric subframe may include a longer duration for UL communication than for UL communication.

In some aspects, the network 100 may be a NR network deployed over a licensed spectrum. The BSs 110 can transmit synchronization signals (e.g., including a primary synchronization signal (PSS) and a secondary synchronization signal (SSS)) in the network 100 to facilitate synchronization. The BSs 110 can broadcast system information associated with the network 100 (e.g., including a master information block (MIB), remaining system information (RMSI), and other system information (OSI)) to facilitate initial network access. In some instances, the BSs 110 may broadcast the PSS, the SSS, and/or the MIB in the form of synchronization signal block (SSBs) over a physical broadcast channel (PBCH) and may broadcast the RMSI and/or the OSI over a physical downlink shared channel (PDSCH).

In some aspects, a UE 120 attempting to access the network 100 may perform an initial cell search by detecting a PSS from a BS 110. The PSS may enable synchronization of period timing and may indicate a physical layer identity value. The UE 120 may then receive a SSS. The SSS may enable radio frame synchronization, and may provide a cell identity value. The cell identity value may be combined with the physical layer identity value to identify the cell. The PSS and the SSS may be located in a central portion of a carrier or any suitable frequencies within the carrier.

After receiving the PSS and SSS, the UE 120 may receive a MIB. The MIB may include system information for initial network access and scheduling information for RMSI and/or OSI. After decoding the MIB, the UE 120 may receive RMSI and/or OSI. The RMSI and/or OSI may include radio resource control (RRC) information related to random access channel (RACH) procedures, paging, control resource set (CORESET) for physical downlink control channel (PDCCH) monitoring, physical UL control channel (PUCCH), physical UL shared channel (PUSCH), power control, and SRS.

After obtaining the MIB, the RMSI and/or the OSI, the UE 120 can perform a random access procedure to establish a connection with the BS 110. In some examples, the random access procedure may be a four-step random access procedure. For example, the UE 120 may transmit a random access preamble and the BS 110 may respond with a random access response. The random access response (RAR) may include a detected random access preamble identifier (ID) corresponding to the random access preamble, timing advance (TA) information, an UL grant, a temporary cell-radio network temporary identifier (C-RNTI), and/or a back-off indicator. Upon receiving the random access response, the UE 120 may transmit a connection request to the BS 110 and the BS 110 may respond with a connection response. The connection response may indicate a contention resolution. In some examples, the random access preamble, the RAR, the connection request, and the connection response can be referred to as message 1 (MSG1), message 2 (MSG2), message 3 (MSG3), and message 4 (MSG4), respectively. In some examples, the random access procedure may be a two-step random access procedure, where the UE 120 may transmit a random access preamble and a connection request in a single transmission and the BS 110 may respond by transmitting a random access response and a connection response in a single transmission.

After establishing a connection, the UE 120 and the BS 110 can enter a normal operation stage, where operational data may be exchanged. For example, the BS 110 may schedule the UE 120 for UL and/or DL communications. The BS 110 may transmit UL and/or DL scheduling grants to the UE 120 via a PDCCH. The scheduling grants may be transmitted in the form of DL control information (DCI). The BS 110 may transmit a DL communication signal (e.g., carrying data) to the UE 120 via a PDSCH according to a DL scheduling grant. The UE 120 may transmit an UL communication signal to the BS 110 via a PUSCH and/or PUCCH according to an UL scheduling grant.

In some aspects, the network 100 may operate over a system BW or a component carrier (CC) BW. The network 100 may partition the system BW into multiple BWPs (e.g., portions). A BS 110 may dynamically assign a UE 120 to operate over a certain BWP (e.g., a certain portion of the system BW). The assigned BWP may be referred to as the active BWP. The UE 120 may monitor the active BWP for signaling information from the BS 110. The BS 110 may schedule the UE 120 for UL or DL communications in the active BWP. In some aspects, a BS 110 may assign a pair of BWPs within the CC to a UE 120 for UL and DL communications. For example, the BWP pair may include one BWP for UL communications and one BWP for DL communications.

In some aspects, the network 100 may be an NR network supporting carrier aggregation (CA) of component carriers (CCs) in which more than one cell can be activated to support DL/UL transmissions. Each cell may correspond to a different CC, and may be within a same frequency band or within different frequency bands.

As indicated above, FIG. 1 is provided as an example. Other examples may differ from what is described with regard to FIG. 1.

Figure 2:
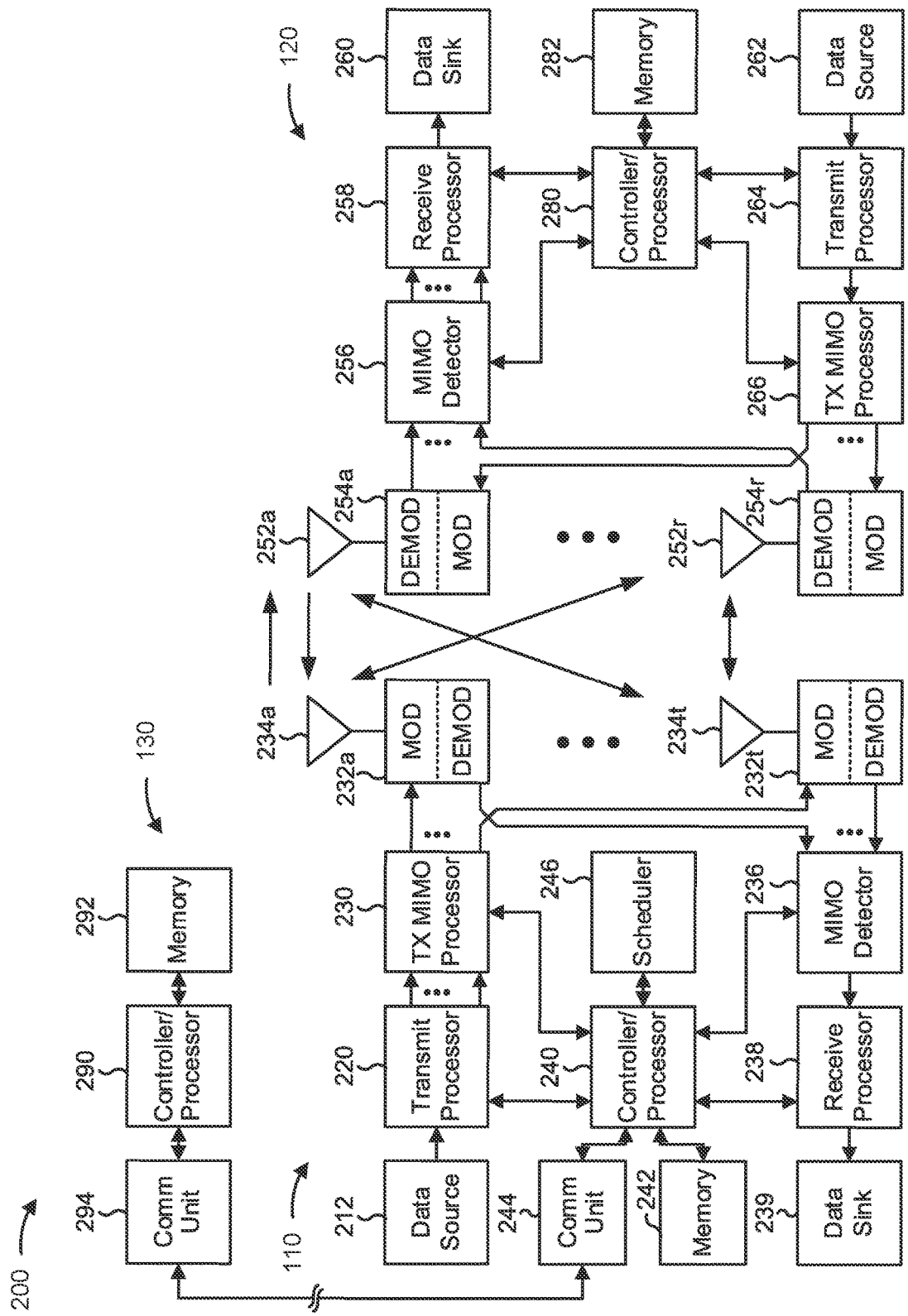
FIG. 2 is a diagram illustrating an example of a base station in communication with a UE in a wireless communication network, in accordance with various aspects of the present disclosure.

FIG. 2 shows a block diagram of a design 200 of base station 110 and UE 120. The UE 120 may be one of the base stations and one of the UEs in FIG. 1. Base station 110 may be equipped with T antennas 234a through 234t, and UE 120 may be equipped with R antennas 252a through 252r, where in general T≥1 and R≥1.

At base station 110, a transmit processor 220 may receive data from a data source 212 for one or more UEs, select one or more modulation and coding schemes (MCS) for each UE based at least in part on channel quality indicators (CQIs)

received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI) and/or the like) and control information (e.g., CQI requests, grants, upper layer signaling, and/or the like) and provide overhead symbols and control symbols. Transmit processor 220 may also generate reference symbols for reference signals (e.g., the cell-specific reference signal (CRS)) and synchronization signals (e.g., the primary synchronization signal (PSS) and secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM and/or the like) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively. According to various aspects described in more detail below, the synchronization signals can be generated with location encoding to convey additional information.

At UE 120, antennas 252a through 252r may receive the downlink signals from base station 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM and/or the like) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. A channel processor may determine reference signal received power (RSRP), received signal strength indicator (RSSI), reference signal received quality (RSRQ), channel quality indicator (CQI), and/or the like. In some aspects, one or more components of UE 120 may be included in a housing.

On the uplink, at UE 120, a transmit processor 264 may receive and process data from a data source 262 and control information (e.g., for reports comprising RSRP, RSSI, RSRQ, CQI, and/or the like) from controller/processor 280. Transmit processor 264 may also generate reference symbols for one or more reference signals. The symbols from transmit processor 264 may be precoded by a TX MIMO processor 266 if applicable, further processed by modulators 254a through 254r (e.g., for DFT-s-OFDM, CP-OFDM, and/or the like), and transmitted to base station 110. At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Network controller 130 may include communication unit 294, controller/processor 290, and memory 292.

Controller/processor 240 of base station 110, controller/processor 280 of UE 120, and/or any other component(s) of FIG. 2 may perform one or more techniques associated with collision avoidance in a multi-subscriber identity module (MSIM) UE, as described in more detail elsewhere herein. For example, controller/processor 240 of base station 110, controller/processor 280 of UE 120, and/or any other component(s) of FIG. 2 may perform or direct operations of, for example, scheme 500 of FIG. 5 and/or other processes as described herein. Memories 242 and 282 may store data and program codes for base station 110 and UE 120, respectively. In some aspects, memory 242 and/or memory 282 may comprise a non-transitory computer-readable medium storing one or more instructions for wireless communication. For example, the one or more instructions, when executed by one or more processors of the base station 110 and/or the UE 120, may perform or direct operations of, for example, the method 500 of FIG. 5 and/or other processes as described herein. A scheduler 246 may schedule UEs for data transmission on the downlink and/or uplink.

In some aspects, UE 120 may include means for detecting a radio access technology (RAT) of a first cell on which a first subscription of the UE is configured to camp is same as the RAT of a secondary cell group (SCG) on which a second subscription of the UE that is in a dual connectivity mode is configured to camp; and means for triggering, in response to the detecting, the first subscription or the second subscription to perform a mode operation of the second subscription or the first subscription, respectively. In some aspects, the UE 120 may be camped using one or more subscriptions, on one or more cells based on a cell selection or reselection process. For example, the UE 120 may be considered "camped" on a cell if the UE 120 has performed a cell selection or reselection process and has identified a suitable cell for camping, and has registered on the cell. The UE 120 may be in various communication states with a network device, such as a BS. For example, the UE 120 may be in a connected state, an idle state, an inactive state, and/or any suitable state. The communication state may be a radio resource control (RRC) state. For example, the UE 120 may be in RRC_CONNECTED, RRC_IDLE, or RRC_INACTIVE. In some aspects, in RRC_CONNECTED, the UE 120 may have the RRC context including the parameters involved for communication between the UE 120 and the network, and the UE 120 has registered to a cell. In RRC_IDLE, the UE 120 may not have the parameters for communication between the UE 120 and the network. In some aspects, such means may include one or more components of UE 120 described in connection with FIG. 2, such as controller/processor 280, transmit processor 264, TX MIMO processor 266, MOD 254, antenna 252, DEMOD 254, MIMO detector 256, receive processor 258, and/or the like.

As indicated above, FIG. 2 is provided as an example. Other examples may differ from what is described with regard to FIG. 2.

Figure 3:
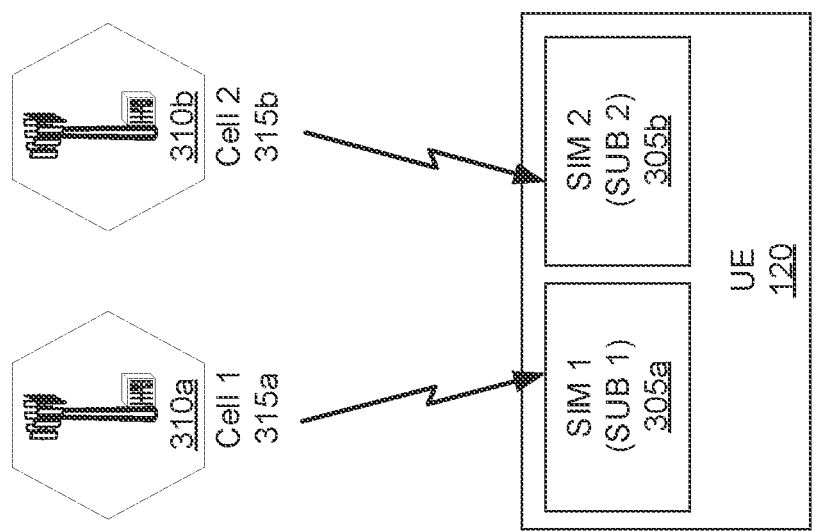
FIG. 3 is a diagram illustrating an example of operations of a multi-subscriber identity module user equipment, in accordance with various aspects of the present disclosure.

FIG. 3 is a diagram illustrating an example 300 of operations of a multi-subscriber identity module (multi-SIM) UE, in accordance with various aspects of the present disclosure. As shown in FIG. 3, a UE 120 may be a multi-SIM UE that includes multiple SIMs (e.g., two or more SIMs), shown as a first SIM 305a (shown as SIM 1) and a second SIM 305b (shown as SIM 2). The first SIM 305a may be associated with a first subscription (shown as SUB 1), and the second SIM 305b may be associated with a second subscription (shown as SUB 2). "Subscription" may refer to a subscription with a network operator (e.g., a mobile network operator (MNO)) that permits the UE 120 to access a wireless network (e.g., a radio access network (RAN)) associated with the network operator. A SIM 305 may be a removable SIM (e.g., a SIM card) or an embedded SIM. A SIM 305 may include an integrated circuit that securely stores an international mobile subscriber identity (IMSI) and a security key, which are used to identify and authenticate a corresponding subscription associated with the SIM 305. In some cases, a SIM 305 may store a list of services that the UE 120 has permission to access using a subscription associated with the SIM 305, such as a data service, a voice service, and/or the like.

As further shown in FIG. 3, the UE 120 may communicate (e.g., in a connected mode or an idle mode) with a first base station 310a via a first cell 315a (shown as Cell 1) using the first SIM 305a. In this case, a first subscription (SUB 1) of the UE 120 may be used to access the first cell 315a (e.g., using a first IMSI for UE identification, using a first security key for UE authentication, using a first list of services that the UE 120 is permitted to access using the first subscription, by counting data and/or voice usage on the first cell against the first subscription, and/or the like). Similarly, the UE 120 may communicate (e.g., in a connected mode or an idle mode) with a second base station 310b via a second cell 315b (shown as Cell 2) using the second SIM 305b. In this case, a second subscription (SUB 2) of the UE 120 may be used to access the second cell 315b (e.g., using a second IMSI for UE identification, using a second security key for UE authentication, using a second list of services that the UE 120 is permitted to access using the second subscription, by counting data and/or voice usage on the second cell against the second subscription, and/or the like). The first base station 310a and/or the second base station 310b may include one or more of the base stations 110 described above in connection with FIG. 1.

In some aspects, the UE 120 may be a dual SIM dual standby (DSDS) UE, where SIM 1 305a and SIM 2 305b may share a single transceiver. In such cases, SIM 1 305a and SIM 2 305b can both be used in idle mode (time multiplexing can be used to maintain both SIMs in idle mode). However, only one of the two SIMs can be used in an active mode; i.e., the radio connection to one of the SIMS may be disabled when the other SIM is connected in an active mode. For example, when one of SIM 1 305a and SIM 2 305b is in an active state, i.e., when the radio connection between the UE 120 and the network (e.g., LTE network, NR network, etc.) is active, the radio connection for the other SIM may become disabled because only one of SIM 1 305a and SIM 2 305b can be used in the active mode when the UE 120 is a DSDS UE.

In some aspects, one of the subscriptions of the MSIM UE 120 may be a dedicated data subscription (DDS) subscription that is configured for receiving data services from the network on which that subscription is camped while the other subscription may be a non-DDS (n-DDS) subscription. In some instances, the DDS subscription may be camped on an LTE network or NR network. Further, in some instances, the n-DDS subscription may be camped on a NR network. In some instances, the MSIM UE 120 may be a DSDS UE, and one of the subscriptions may be a DDS subscription in an active mode and the other subscription may be a n-DDS subscription in an idle mode. For example, with reference to FIG. 3, SUB 1 that is associated with SIM 1 305a may be a DDS subscription in an active mode camped on an LTE network or NR network and SUB 2 that is associated with SIM 2 305b may be a non-DDS subscription in an idle mode camped on a NR network.

In some aspects, the data services that are received by the DDS subscription (e.g., SUB 1) from the network (e.g., LTE network, NR network, etc.) on which the DDS subscription is camped may include evolved multimedia broadcast multicast services (eMBMS) data services. That is, the data services may be a point-to-multipoint data services which may include, for example, downlink data transmissions such as but not limited to live streaming data, mobile TV data, radio broadcasting data, emergency alert data, etc., from an LTE BS or a NR BS to multiple UEs (e.g., including the UE 120). For example, SUB 1 of the MSIM UE 120 may be a DDS subscription. The DDS subscription may be configured to receive eMBMS data from an LTE/NR BS. In such instances, SUB 1 (e.g., the DDS subscription) may access the eMBMS data at some durations in time domain of the radio connection (i.e., time durations of the radio resources of the connection) between SUB 1 of the MSIM UE 120 and the base station transmitting the eMBMS data. In some cases, the durations in the time domain via which the eMBMS data are transmitted may be fixed time slots of the radio resources/connection, which may save radio resources.

In general, any number of wireless networks may be deployed in a given geographic area. Each wireless network may support a particular radio access technology (RAT) and may operate on one or more frequencies. A RAT may also be referred to as a radio technology, an air interface, and/or the like. A frequency may also be referred to as a carrier, a frequency channel, and/or the like. Each frequency may support a single RAT in a given geographic area in order to avoid interference between wireless networks of different RATs. In some cases, LTE RAT networks may be deployed. In some cases, NR or 5G RAT networks may be deployed. In some instances, a NR RAT network may be deployed in so-called standalone (SA) mode or non-standalone (NSA) mode. In SA mode, the wireless network may only include NR RAT, i.e., for example, the wireless network may only include NR or 5G Node B (gNB) base stations and the 5G NR base stations are used for both control plane functionality and data plane communication. In NSA mode, the wireless network may include both LTE enhanced node (eNB) base stations as well as NR gNB base stations, and the LTE base stations may be used for control plane functionality and the 5G NR base stations may be used for data plane communication. In some cases, the LTE eNBs may serve as master nodes (e.g., make up the master cell group (MCG) of the wireless network) and the NR gNBs may serve as secondary nodes (e.g., make up the secondary cell group (SCG) of the wireless network). That is, the MCG may be LTE MCG and the SCG may be NR/5G SCG.

In some instances, a UE may run in NSA mode, where the UE may communicate to both an LTE BS and a 5G NR BS. The UE may use the LTE BS for control plane functionality, and the 5G NR BS for data plane communication. Where service providers have enabled the wireless network to function with NSA operation, the core network utilizes aspect of each BS to facilitate communication with the UE. In order to initiate NSA operation, the UE attaches to the LTE BS and signals that it supports dual connectivity (DC) operation. The LTE and 5G BSs then communicate to establish data communication via the 5G NR BS and control information communication via the LTE BS.

Figure 4:
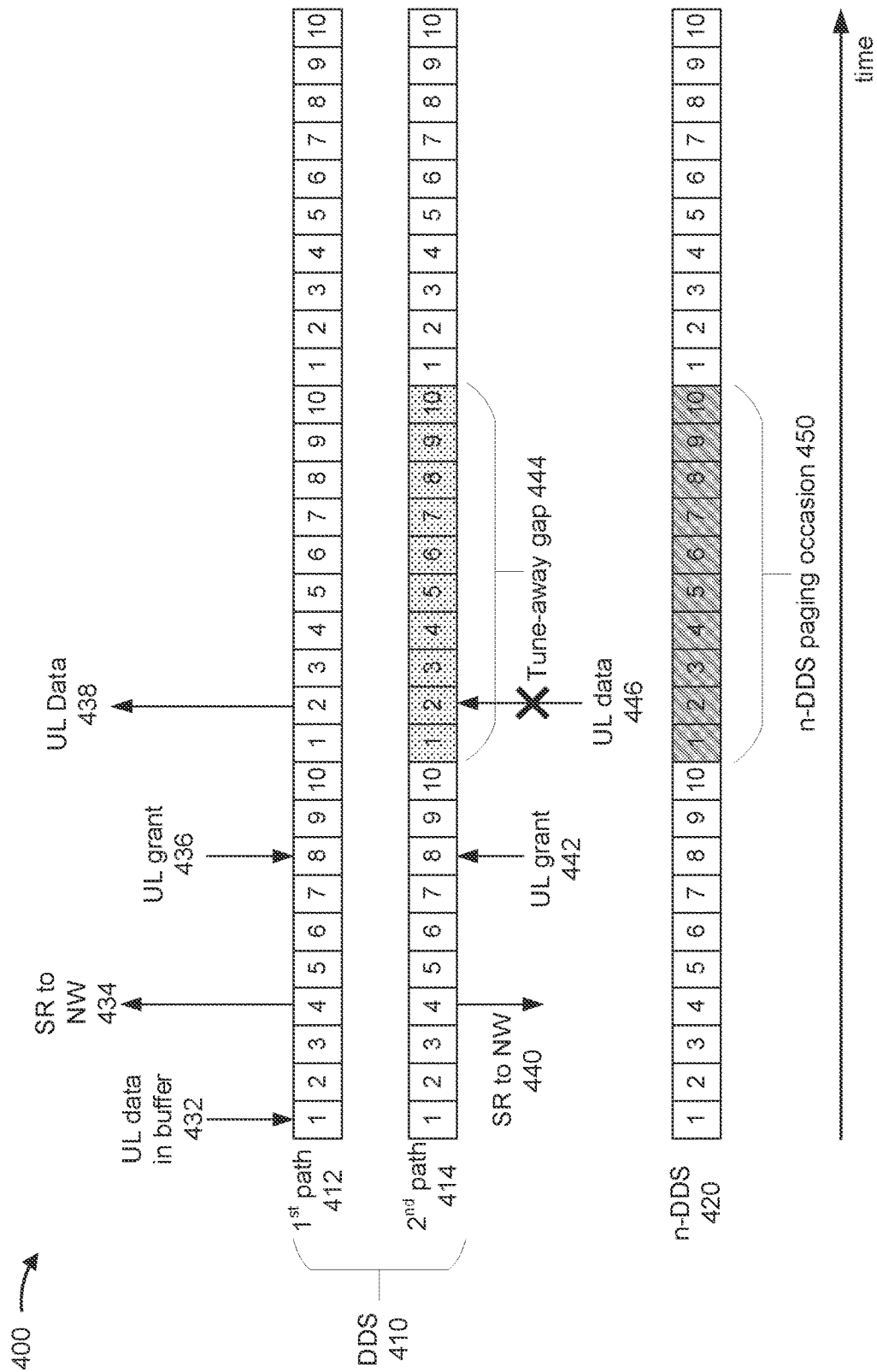
FIG. 4 is a diagram illustrating a multi-subscriber identity module (MSIM) dual connectivity UL data scheduling scheme, in accordance with various aspects of the present disclosure.

FIG. 4 shows an example diagram illustrating a MSIM dual connectivity communication scheme 400 in accordance with various aspects of the present disclosure. In some instances, the scheme 400 may be employed by UEs such as the UEs 120 in a network such as the network 100, UE 120 in design 200, or UE 120 in example 300. The scheme 400 may also be employed by BSs such as the BSs 110 in the network 100, the BS 110 in design 200, or one or more of the BSs 310a, 310b in example 300. The UE may have a dedicated data subscription (DDS) 410 and a non-dedicated data subscription (n-DDS) 420. The UE may be configured to utilize the DDS 410 in a connected mode. Further, the UE is configured to utilize the DDS 410 in a dual connectivity mode. For example, the UE may be configured to utilize the DDS 410 in a NSA mode in which the one BS is a NR BS and the other BS is an LTE BS. In another example, the UE may be configured to utilize the DDS 410 in a SA mode in which both BSs are NR BSs. In the illustrated example, the UE is configured to communicate on a primary communication path 412 ($1^{st}$ path), and a secondary communication path 414 ($2^{nd}$ path). In some aspects, the UE may communicate with a first BS on the primary communication path 412 and with a second BS on the secondary communication path 414. In some aspects, the first and second BS may communicate with a same core network. In some aspects, the first BS and the second BS operate according to a same RAT. In other aspects, the first BS and the second BS operate according to different RATs. For example, the primary communication path 412 may be associated with LTE, and the secondary communication path 414 may be associated with 5G NR. In some aspects, the UE may communicate on the n-DDS 420 using a same RAT as at least one of the primary communication path 412 or the secondary communication path 414. The UE may be configured to communicate via a radio resource (e.g., a bandwidth part (BWP)) of one or more frequency bands when operating in the connected mode of the DDS. In the illustrated example, the UE may be configured to communicate on the n-DDS and the secondary path 414 of the DDS 410 using one or more overlapping frequency bands. Accordingly, in some aspects, communications on the n-DDS 420 may potentially use the same frequency resources as communications on the secondary communication path 414 of the DDS 410. Further, the UE may be configured to receive paging messages on the n-DDS 420 during one or more paging occasions, such as paging occasion 450. In FIG. 4, the x-axis represents time in some arbitrary units. The timeline of each communication path of the DDS 410 and the n-DDS 420 are shown as integers from 1-10. The integers may correspond to a slot frame number (SFN), a slot index, and/or any other suitable value. Although illustrated as aligned in time, it will be understood that the timelines of one or more of the communication paths may be misaligned or offset from at least one other communication path.

While operating with the DDS 410 in the connected mode, the UE receives UL data in an UL buffer in action 432. The UE may compare a volume or amount of the UL data in the buffer to a threshold, such as an UL buffer threshold. For example, the UE may determine whether the UL data in the buffer exceeds a UL-DataSplitThreshold value, or another data size threshold. The UL-DataSplitThreshold may be configured by RRC signaling. For example, the UE may receive a packet data convergence protocol (PDCP) configuration indicating one or more PDCP parameters for signaling and data radio bearers. The PDCP configuration may indicate the UL buffer threshold. The UE may be configured to transmit all UL data in the buffer on the primary path up and until the volume of the UL data exceeds the UL buffer threshold. If the volume of the UL data exceeds the threshold, the UE may trigger UL grants for both the primary path 412, and the secondary path 414 by transmitting a scheduling request on each communication path. In this regard, the UE transmits scheduling requests (SRs) on the primary path and the secondary path in actions 434 and 440, respectively.

The network (e.g., nodeB/core network), upon receiving the scheduling requests, transmits UL grants to the UE on the primary path and the secondary path in actions 436 and 442, respectively. Transmitting the UL grants may include transmitting downlink control information (DCI) in PDCCH for each communication path. In this regard, it will be understood that the communication parameters for the DCI may be different for each communication path. For example, if the primary communication path and the secondary communication path correspond to different RATs, the time, frequency, size, and or other parameters of the PDCCH may be different. The UL grants indicate time/frequency resources for each of the primary path and the secondary path for transmitting portions of the UL data on each path.

At action 438, the UE transmits, on the primary path 412, UL data in the UL resources indicated in the UL grant transmitted at action 436. In some aspects, the UE transmits the UL data in a PUSCH. In some aspects, action 438 includes transmitted a buffer status report (BSR) with a portion of the UL data associated with the UL grant. In some aspects, the network may determine, based on the BSR, a further UL grant for communicating the remaining UL data in the UL buffer.

At action 446, the UE fails to transmit the UL data on the secondary path 414. In this regard, the UL grant indicates that the scheduled UL resources are within a tune-away gap 444 due to the n-DDS paging occasion 450 on the n-DDS. Accordingly, the DDS 410 may have an outage of transmit and receive resources on at least the secondary path 414. Thus, the UE may fail to transmit the portion of the UL data in the buffer associated with the UL grant received in action 442. The failed transmission may result in increased block error ratio (BLER), increased latency, and unrecoverable errors in some instances.

The present disclosure provides schemes and mechanisms for preempting a scheduling request on at least one communication path in a dual connectivity wireless communication scenario. In some aspects, the schemes and mechanisms may be used for MSIM wireless communication devices, such as an MSIM UE. In one example, an MSIM UE receives UL data in an UL buffer of the MSIM UE. The UL data may exceed an UL buffer threshold. In some aspects, the MSIM UE may be configured to trigger scheduling requests on each of the dual connectivity communication paths based on the volume of the UL data exceeding the UL buffer threshold. In the mechanism described below, the MSIM UE may refrain from transmitting a scheduling request on a communication path if there is a scheduled outage for a tune-away gap within a tune-away delay threshold. For example, the UE may determine whether the time between receiving the UL data in the buffer and the next scheduled tune-away gap exceeds the tune-away delay threshold.

Figure 5:
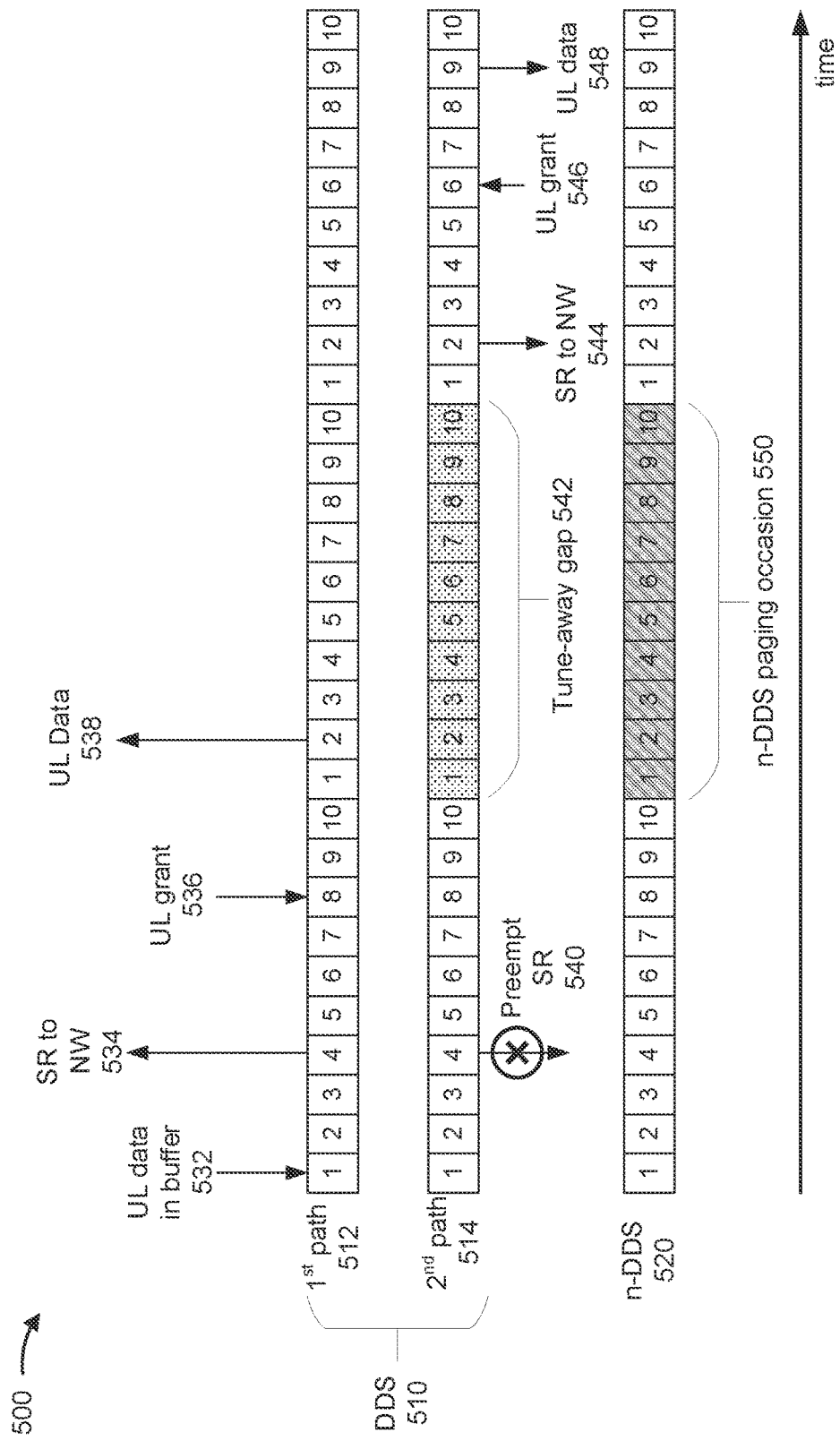
FIG. 5 is a diagram illustrating a multi-subscriber identity module (MSIM) dual connectivity UL data scheduling scheme, in accordance with various aspects of the present disclosure.

FIG. 5 shows an example diagram illustrating a MSIM dual connectivity communication scheme 500 in accordance with various aspects of the present disclosure. In some instances, the scheme 500 may be employed by UEs such as the UEs 120 in a network such as the network 100, UE 120 in design 200, or UE 120 in example 300. The scheme 500 may also be employed by BSs such as the BSs 110 in the network 100, the BS 110 in design 200, or one or more of the BSs 310a, 310b in example 300. The UE may have a dedicated data subscription (DDS) 510 and a non-dedicated data subscription (n-DDS) 520. The UE may be configured to utilize the DDS 510 in a connected mode. Further, the UE may be configured to utilize the DDS 510 in a dual connectivity mode. For example, the UE may be configured to utilize the DDS 510 in a NSA mode in which the one BS is a NR BS and the other BS is an LTE BS. In another example, the UE may be configured to utilize the DDS 510 in a SA mode in which both BSs are NR BSs. In the illustrated example, the UE may be configured to communicate on a primary communication path 512 ($1^{st}$ path), and a secondary communication path 514 ($2^{nd}$ path). In some aspects, the UE may communicate with a first BS on the primary communication path 512 and with a second BS on the secondary communication path 514. In some aspects, the first and second BS may communicate with a same core network. In some aspects, the first BS and the second BS operate according to a same RAT (e.g., 5G NR). In other aspects, the first BS and the second BS operate according to different RATs (e.g., LTE and 5G NR). For example, the primary communication path 512 may be associated with LTE, and the secondary communication path 514 may be associated with 5G NR. In some aspects, the UE may communicate on the n-DDS 520 using a same RAT as at least one of the primary communication path 512 or the secondary communication path 514. The UE may be configured to communicate via a radio resource (e.g., a bandwidth part (BWP)) of one or more frequency bands when operating in the connected mode of the DDS. In the illustrated example, the UE may be configured to communicate on the n-DDS and the secondary path 514 of the DDS 510 using one or more overlapping frequency bands. Accordingly, in some aspects, communications on the n-DDS 520 may potentially use the same frequency resources as communications on the secondary communication path 514 of the DDS 510. Further, the UE may be configured to receive paging messages on the n-DDS 520 during one or more paging occasions, such as paging occasion 550. In FIG. 5, the x-axis represents time in some arbitrary units. The timeline of each communication path of the DDS 510 and the n-DDS 520 are shown as integers from 1-10. The integer values may correspond to a slot frame number (SFN), a slot index, and/or any other suitable value. Although illustrated as aligned in time, it will be understood that the timelines of one or more of the communication paths may be misaligned or offset from at least one other communication path.

While operating with the DDS 510 in the connected mode, the UE receives UL data in an UL buffer in action 532. The UE may compare a volume or amount of the UL data in the buffer to a threshold, such as an UL buffer threshold. For example, the UE may determine whether the UL data in the buffer exceeds a UL-DataSplitThreshold value, or another data size threshold. The UL-DataSplit-Threshold value may be configured by RRC signaling. For example, the UE may receive a packet data convergence protocol (PDCP) configuration indicating one or more PDCP parameters for signaling and data radio bearers. The PDCP configuration may indicate the UL buffer threshold. The UE may be configured to transmit all UL data in the buffer on the primary path up and until the volume of the UL data exceeds the UL buffer threshold. If the volume of the UL data exceeds the threshold, the UE may be configured to trigger, or schedule, scheduling requests for both the primary path 512, and the secondary path 514.

In the scheme 500, the UE determines, for each of the primary path 512 and the secondary path 514, whether the DDS 510 has any scheduled tune-away gaps associated with a n-DDS paging occasion. In some aspects, the UE may determine the presence of tune-away gaps based on system information associated with at least one of the n-DDS 520 or the DDS 510. For example, the UE may determine, based on n-DDS system information, a schedule for paging occasions, and determine the tune-away gaps for the DDS 510 based on the paging occasion schedule. In other aspects, the UE may determine, based on a tune-away gap configuration for the DDS 510, the tune-away gap timing parameters. The tune-away gap timing parameters may include the slot format number (SFN), periodicity, length, and/or any other suitable timing configuration for the tune-away gaps.

Based on the timing of the tune-away gaps, the UE determines whether any tune-away gaps are scheduled on at least one of the primary path 512 or the secondary path 514 within a tune-away delay threshold of the triggered scheduling request. For example, the UE may determine whether the time period between receiving the UL data in the buffer and next scheduled tune-away gap exceeds the tune-away delay threshold. The tune-away delay threshold may be associated with a minimum configured delay between a scheduling request and a scheduled PUSCH, in some aspects. For example, in some aspects, the minimum delay between transmitting a scheduling request and completing a PUSCH transmission may be 8 ms for frequency division duplexing (FDD) and 10 ms for time division duplexing (TDD). In some aspects, the tune-away delay threshold may be equal to the minimum PUSCH delay for the respective duplexing mode. In other aspects, the tune-away delay threshold may be offset from the minimum PUSCH delay for the respective duplexing mode.

At action 534, the UE transmits, on the primary communication path 512, a scheduling request to the network. In some aspects, transmitting the scheduling request may include transmitting uplink control information (UCI) in a PUCCH. In some aspects, the PUCCH may include a periodic PUCCH assigned to the UE. However, at action 540, the UE refrains from transmitting a scheduling request on the secondary communication path 514. In this regard, the UE refrains from transmitting the scheduling request based on the tune-away gap 542 (and n-DDS paging occasion 550) being scheduled within the tune-away delay threshold mentioned above. In some aspects, action 534 includes the UE comparing the time period between the UL data arriving in the buffer and the beginning of the tune-away gap 542 to a configured tune-away delay threshold.

The network (e.g., nodeB/core network), upon receiving the scheduling request, transmits an UL grant to the UE on the primary path in action 536. Transmitting the UL grant may include transmitting downlink control information (DCI) in PDCCH for the first communication path 512. The UL grant may indicate time/frequency resources for the primary communication path 512 for transmitting at least a portion of the UL data.

At action 538, the UE transmits, on the first path 512, UL data in the UL resources indicated in the UL grant transmitted at action 536. In some aspects, the UE transmits the UL data in a PUSCH. In some aspects, action 538 includes transmitting a BSR with a portion of the UL data associated with the UL grant. Transmitting the BSR may include transmitting a media access control-control element (MAC-CE) in the PUSCH indicated in the UL grant, where the MAC-CE includes the BSR. In some aspects, the network may determine, based on the BSR, a further UL grant for communicating the remaining UL data in the UL buffer.

At action 544, the UE transmits, following the tune-away gap 542 on the secondary communication path 514, a scheduling request. The network (e.g., nodeB/core network), upon receiving the scheduling request, transmits an UL grant to the UE on the secondary communication path 514 in action 546. Transmitting the UL grant may include transmitting downlink control information (DCI) in PDCCH for the secondary communication path 514. The UL grant may indicate time/frequency resources for the secondary communication path 514 for transmitting at least a portion of the UL data. In some aspects, actions 544 and 546 may be based on UL data remaining in the buffer.

At action 548, the UE transmits, on the secondary communication path 514 a remaining portion of the UL data in the UL resources indicated in the UL grant transmitted at action 546. In some aspects, the UE transmits the UL data in a PUSCH. In some aspects, action 548 includes transmitting a BSR with a portion of the UL data associated with the UL grant. In some aspects, the network may determine, based on the BSR, a further UL grant for communicating the remaining UL data in the UL buffer.

Figure 6:
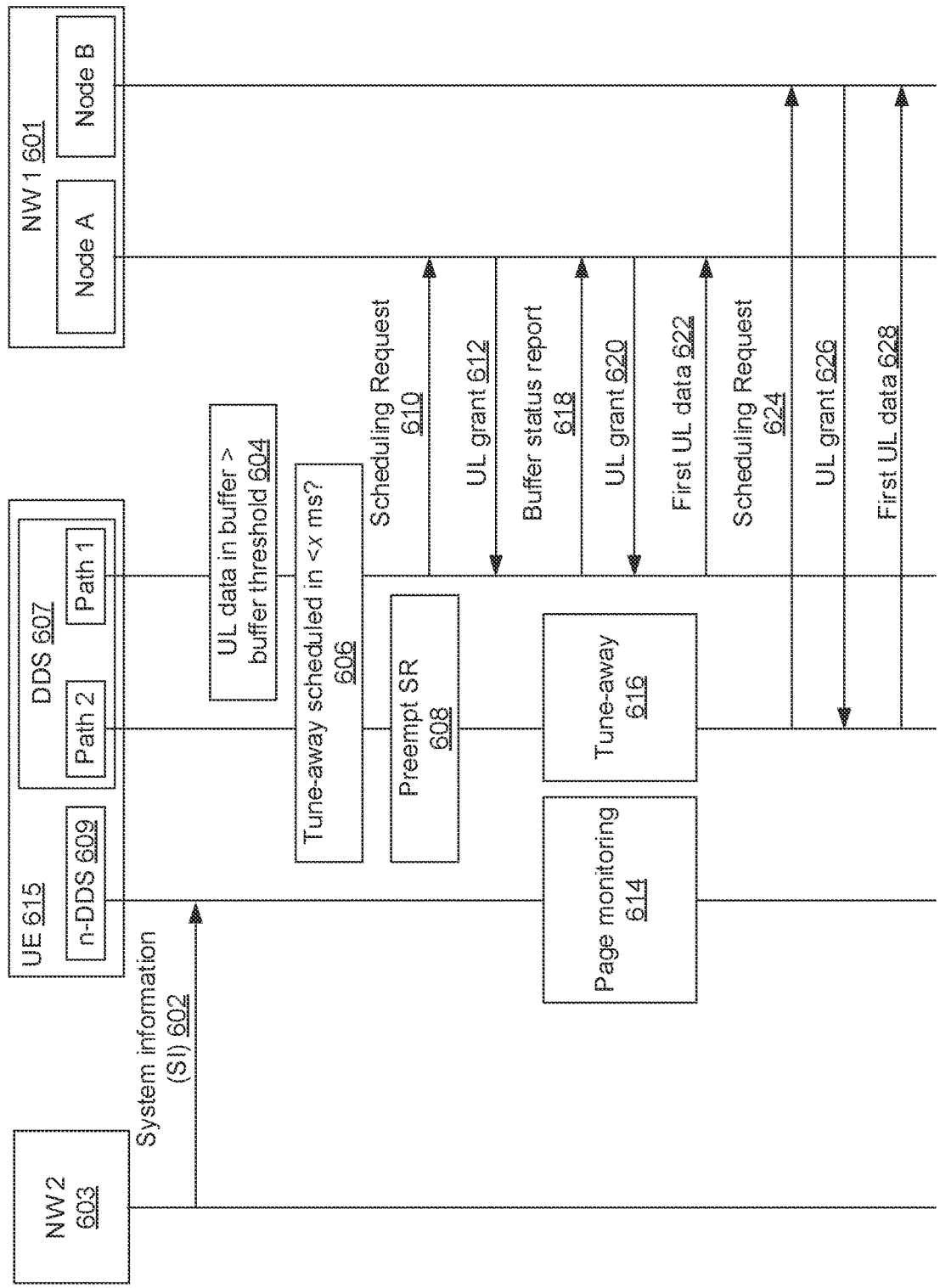
FIG. 6 is a signaling diagram of a scheme for MSIM dual connectivity UL data scheduling, in accordance with various aspects of the present disclosure.

FIG. 6 is a signaling diagram of a scheme 600 for dual connectivity UL scheduling according to some aspects of the present disclosure. In some instances, the scheme 600 is employed by a UE 515, a first network (NW 1) 601, and a second network (NW 2) 603. The UE 120 may be a MSIM UE, for example. In some aspects, the networks 601, 603 may include BSs, and/or other wireless communication devices. The network 601 may be configured to communicate using a first node (Node A) and a second node (Node B). Aspects of the scheme 600 may be performed by the UEs 120 and BSs 110 in the network 100, UE 120 in design 200, BS 110 in design 200, a UE 120 in example 300, and/or a BS 310 in the example 300.

In some instances, the UE 120 in FIG. 6 may operate using a DDS 607 and a n-DDS 609. The UE may be configured with the DDS in a connected mode, and the n-DDS in an idle mode. Further, the UE may be The UE may be configured to operate at least one of the subscriptions using a dual connectivity mode. In the illustrated example, the UE may be configured to communicate on the DDS using a dual connectivity mode. In the dual connectivity mode, the UE may communicate on a first path (Path 1) with Node A, and on a second path (Path 2) with Node B. In some aspects, Path 1 may be a primary communication path, and Path 2 may be a secondary communication path. The communication paths may be associated with a same radio access technology (RAT), or different RATs. For example, the primary communication path may be associated with LTE, and the secondary communication path may be associated with 5G NR. As mentioned above, dual connectivity using different RATs may be referred to as non-standalone (NSA) dual connectivity. Dual connectivity using a same RAT (e.g., 5G NR) may be referred to as standalone (SA) dual connectivity.

At action 602, the UE 615 receives system information from the second network 603. In some aspects, the system information may include a system information block (SIB) message including one or more system parameters or configurations. For example, the system information may include or indicate a paging configuration for the n-DDS 609. The paging configuration may include or indicate timing-related parameters for monitoring for paging messages from the network while the n-DDS is in idle mode, for example.

While operating with the DDS 607 in the connected mode, the UE 615 receives UL data in an UL buffer in action 604. The UE 615 may compare an or volume amount of the UL buffer in the data to a threshold, such as an UL buffer threshold. For example, the UE 615 may determine whether the UL data in the buffer exceeds a UL-DataSplitThreshold value, or another data size threshold. The UL-DataSplit-Threshold value may be configured by RRC signaling. For example, the UE 615 may receive a packet data convergence protocol (PDCP) configuration indicating one or more PDCP parameters for signaling and data radio bearers. The PDCP configuration may indicate the UL buffer threshold. The UE 615 may be configured to transmit all UL data in the buffer on the primary path up and until the volume of the UL data exceeds the UL buffer threshold. If the volume of the UL data exceeds the threshold, the UE 615 may be configured to trigger, or schedule, scheduling requests for both the primary path, and the secondary path.

In action 606, the UE 615 determines, for each of the primary path and the secondary path, whether the DDS 607 has a scheduled tune-away gap scheduled within x ms of receiving the data in the UL buffer. In some aspects, the value x may represent a tune-away delay threshold. Further, in some aspects, the value x may be measured in units other than ms. For example, x may be measured in slots, symbols, frames, and/or any other suitable unit of measurement. In some aspects, the UE 615 may determine the presence of tune-away gaps based on the system information provided in action 602. For example, the UE 615 may determine, based on the n-DDS system information, a schedule for paging occasions. The UE 615 may determine that the page monitoring occasion 614 will result in a tune-away 616, for example. The UE 615 may determine the tune-away gaps for the DDS 607 based on the paging occasion schedule. In other aspects, the UE 615 may determine, based on a tune-away gap configuration for the DDS 607, the tune-away gap timing parameters. The tune-away gap timing parameters may include the slot format number, periodicity, length, and/or any other suitable timing configuration for the tune-away gaps.

In some aspects, action 606 may include the UE 615 determining whether the time period between receiving the UL data in the buffer and next scheduled tune-away gap exceeds the tune-away delay threshold. The tune-away delay threshold may be associated with a minimum configured delay between a scheduling request and a scheduled PUSCH, in some aspects. For example, in some aspects, the minimum delay between transmitting a scheduling request and completing a PUSCH transmission may be 8 ms for frequency division duplexing (FDD) and 10 ms for time division duplexing (TDD). In some aspects, the tune-away delay threshold may be equal to the minimum PUSCH delay for the respective duplexing mode. In other aspects, the tune-away delay threshold may be offset from the minimum PUSCH delay for the respective duplexing mode.

At action 608, the UE 615 preempts, or refrains from transmitting, a scheduling request on the secondary communication path. The UE 615 may refrain from transmitting the scheduling request based on the tune-away scheduled in action 616 being less than the tune-away delay threshold.

At action 610, the UE 615 transmits, on the primary communication path, a scheduling request to the network 601. In some aspects, transmitting the scheduling request may include transmitting uplink control information (UCI) indicating the scheduling request. Accordingly, the UE 615 may transmit the scheduling request in a PUCCH, in some aspects.

The network 601 (e.g., nodeB/core network), upon receiving the scheduling request, transmits an UL grant to the UE 615 on the primary path in action 612. Transmitting the UL grant may include transmitting downlink control information (DCI) in PDCCH for the primary communication path. The UL grant may indicate time/frequency resources for the primary communication path for transmitting at least a portion of the UL data.

At action 614, the UE 605 performs a page monitoring procedure for the n-DDS 609. Action 614 may result in a tune-away gap for the DDS 607, as explained below. In some aspects, action 614 includes performing a blind decoding operation in one or more page monitoring occasions and/or PDCCH monitoring occasions. In some aspects, action 614 includes the UE attempting to decode data scrambled with a P-RNTI in a PDCCH occasion.

At action 616, the UE 605 tunes the DDS 607 away to accommodate the paging occasion associated with action 614. Accordingly, the secondary path of the DDS 607 may experience an outage of receiving and/or transmitting capability due to baseband resource conflicts with the n-DDS 609.

At action 618, the UE 615 transmits, on the primary communication path, a BSR indicating a volume of UL data in the buffer to the network 601. In some aspects, action 618 further includes transmitting at least a portion of the UL data with the BSR. Based on the BSR, the network 601

At action 620, the network transmits, to the UE 615 via Node A, an additional UL grant indicating UL resources based on the BSR. For example, the network 601 may determine the amount of UL resources for the UL grant based on the BSR.

At action 622, the UE 615 transmits UL data in the UL resources indicated in the UL grant transmitted at action 620. In some aspects, the UE 615 transmits the UL data in a PUSCH. In some aspects, the UE 615 may transmit an entirety of the UL data in the buffer to the network 601 via Node A. In other aspects, the UE 615 may transmit only a portion of the UL data to the network 601.

At action 624, the UE 615 transmits, following the tune-away gap on the secondary communication path, a scheduling request. The network (e.g., nodeB/core network), upon receiving the scheduling request, transmits an UL grant to the UE 615 on the secondary communication path in action 626. Transmitting the UL grant may include transmitting downlink control information (DCI) in PDCCH for the secondary communication path. The UL grant may indicate time/frequency resources for the secondary communication path for transmitting at least a portion of the UL data. In some aspects, actions 624 and 626 may be based on UL data remaining in the buffer.

At action 628, the UE 615 transmits, on the secondary communication path, a remaining portion of the UL data in the UL resources indicated in the UL grant transmitted at action 626. In some aspects, the UE 615 transmits the UL data in a PUSCH. In some aspects, action 628 includes transmitting a BSR with a portion of the UL data associated with the UL grant. In some aspects, the network may determine, based on the BSR, a further UL grant for communicating the remaining UL data in the UL buffer.

Accordingly, in the method 600, the UE 615, operating in dual connectivity mode, may preemptively avoid failed UL transmission on at least one communication path. The potential failure may be due to baseband resource conflicts with an n-DDS paging occasion. The UE 615 may be an MSIM UE. In some aspects, the UE 615, may continue to operate in dual connectivity mode and benefit from the dual communication paths even when tune-away gaps interfere with UL data scheduling on at least one of the subscriptions.

Figure 7:
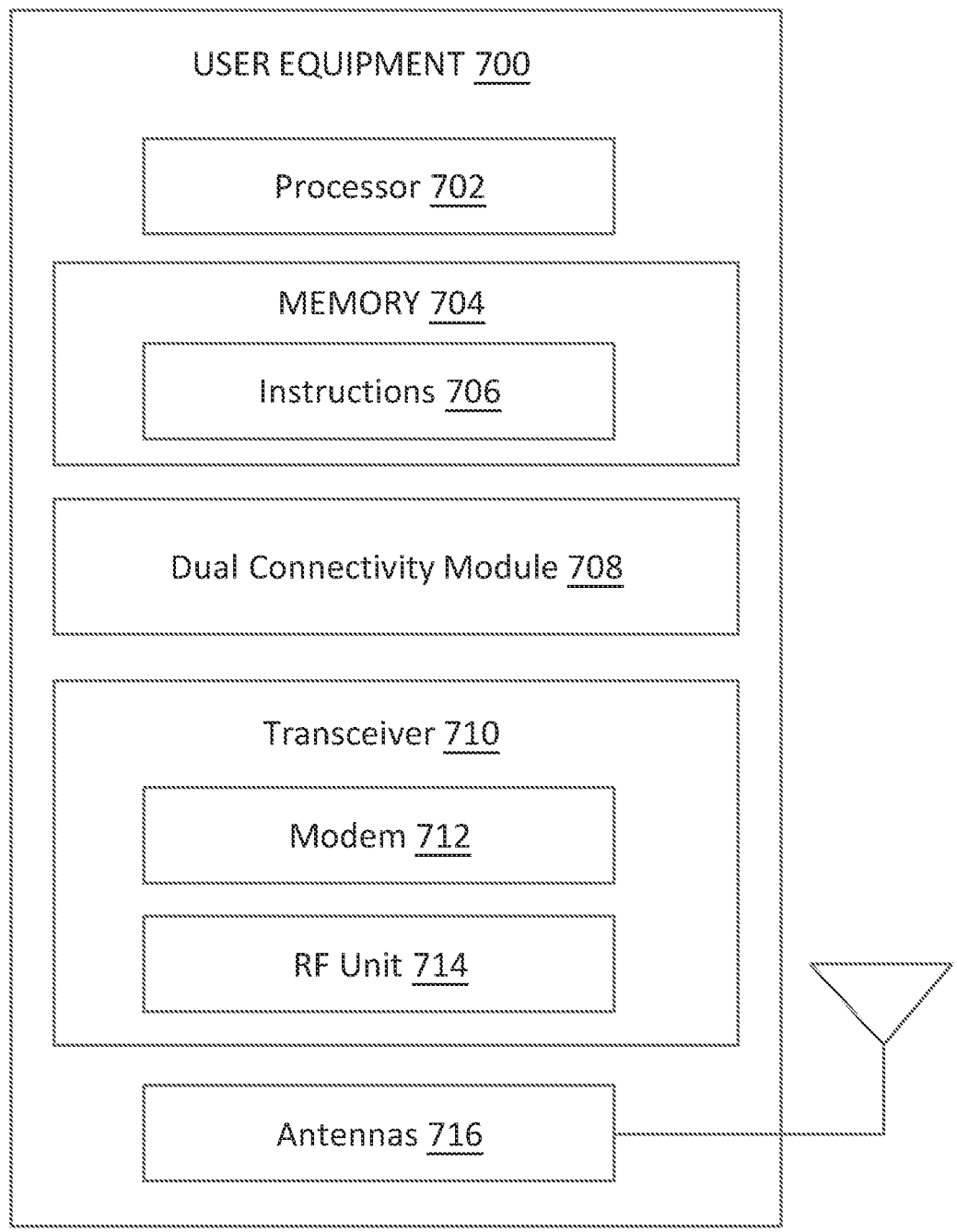
FIG. 7 is a block diagram of an exemplary user equipment according to some aspects of the present disclosure.

FIG. 7 is a block diagram of an exemplary UE 700 according to some aspects of the present disclosure. The UE 700 may be a UE 120 as discussed above with respect to FIGS. 1, 2, and 3. As shown, the UE 700 may include a processor 702, a memory 704, a Dual Connectivity Module 708, a transceiver 710 including a modem subsystem 712 and a radio frequency (RF) unit 714, and one or more antennas 716. These elements may be coupled with one another. The term "coupled" may refer to directly or indirectly coupled or connected to one or more intervening elements. For instance, these elements may be in direct or indirect communication with each other, for example via one or more buses.

The processor 702 may have various features as a specific-type processor. For example, these may include a CPU, a DSP, an ASIC, a controller, a FPGA device, another hardware device, a firmware device, or any combination thereof configured to perform the operations described herein. The processor 702 may also be implemented as a combination of computing devices, e.g., a combination of a DSP and a microprocessor, a plurality of microprocessors, one or more microprocessors in conjunction with a DSP core, or any other such configuration.

The memory 704 may include a cache memory (e.g., a cache memory of the processor 702), RAM, MRAM, ROM, PROM, EPROM, EEPROM, flash memory, a solid state memory device, one or more hard disk drives, memristor-based arrays, other forms of volatile and non-volatile memory, or a combination of different types of memory. In some aspects, the memory 704 may include a non-transitory computer-readable medium. The memory 704 may store instructions 706. The instructions 706 may include instructions that, when executed by the processor 702, cause the processor 702 to perform operations described herein, for example, aspects of FIGS. 1-4, and 7. Instructions 706 may also be referred to as program code, which may be interpreted broadly to include any type of computer-readable statement(s). The program code may be for causing a wireless communication device to perform these operations, for example by causing one or more processors (such as processor 702) to control or command the wireless communication device to do so. The terms "instructions" and "code" should be interpreted broadly to include any type of computer-readable statement(s). For example, the terms "instructions" and "code" may refer to one or more programs, routines, sub-routines, functions, procedures, etc. "Instructions" and "code" may include a single computer-readable statement or many computer-readable statements.

The Dual Connectivity Module 708 may be implemented via hardware, software, or combinations thereof. For example, the Dual Connectivity Module 708 may be implemented as a processor, circuit, and/or instructions 706 stored in the memory 704 and executed by the processor 702. In some examples, the Dual Connectivity Module 708 can be integrated within the modem subsystem 712. For example, the Dual Connectivity Module 708 can be implemented by a combination of software components (e.g., executed by a DSP or a general processor) and hardware components (e.g., logic gates and circuitry) within the modem subsystem 712.

The Dual Connectivity Module 708 may communicate with various components of the UE 700 to perform aspects of the present disclosure, for example, aspects of FIGS. 1-6 and 9. In some aspects, the Dual Connectivity Module 708 is configured to receive or obtain, in an uplink (UL) buffer, first UL data for transmission to at least one base station (BS) via a first path and a second path, wherein the first path and the second path are associated with a dual connectivity communication mode. In another aspect, the Dual Connectivity Module 708 is configured to transmit, or provide for transmission, to a first BS on the first path, a first scheduling request for the first UL data. In some aspects, the Dual Connectivity Module 708 is further configured to refrain, based on a time duration between the receiving the first UL data in the buffer and a tune-away gap on the second path, from transmitting a second scheduling request for the first UL data on the second path.

In some aspects, the Dual Connectivity Module 708 is further configured to receive or obtain, based on the first scheduling request, a first UL grant on the first path, and provide for transmission, to the first BS based on the first UL grant, a buffer status report indicating an amount of the first UL data. In some aspects, the Dual Connectivity Module 708 is further configured to receive or obtain, from the first BS based on the buffer status report, a second UL grant for the first UL data. In some aspects, the Dual Connectivity Module 708 is further configured to provide for transmission, to the first BS on the first path, the first UL data. In some aspects, the Dual Connectivity Module 708 is further configured to provide for transmission, on the second path to a second BS after the tune-away gap, a third scheduling request for the first UL data. In some aspects, the Dual Connectivity Module 708 is further configured to receive or obtain, from the second BS based on the third scheduling request, a third UL grant for the first UL data. In some aspects, the Dual Connectivity Module 708 is further configured to provide for transmission, to the second BS on the second path, the first UL data.

As shown, the transceiver 710 may include the modem subsystem 712 and the RF unit 714. The transceiver 710 can be configured to communicate bi-directionally with other devices, such as the BSs 110. The modem subsystem 712 may be configured to modulate and/or encode the data from the memory 704 and/or the Dual Connectivity Module 708 according to a modulation and coding scheme (MCS), e.g., a low-density parity check (LDPC) coding scheme, a turbo coding scheme, a convolutional coding scheme, a digital beamforming scheme, etc. The RF unit 714 may be configured to process (e.g., perform analog to digital conversion or digital to analog conversion, etc.) modulated/encoded data (e.g., control information (uplink and/or downlink), data (uplink and/or downlink), paging messages, etc.) from the modem subsystem 712 (on outbound transmissions) or of transmissions originating from another source such as a UE 120 or a BS 110. The RF unit 714 may be further configured to perform analog beamforming in conjunction with the digital beamforming. Although shown as integrated together in transceiver 710, the modem subsystem 712 and the RF unit 714 may be separate devices that are coupled together at the UE 120 to enable the UE 120 to communicate with other devices.

The RF unit 714 may provide the modulated and/or processed data, e.g., data packets (or, more generally, data messages that may include one or more data packets and other information), to the antennas 716 for transmission to one or more other devices. The antennas 716 may further receive data messages transmitted from other devices. The antennas 716 may provide the received data messages for processing and/or demodulation at the transceiver 710. The transceiver 710 may provide the demodulated and decoded data (e.g., control information (uplink and/or downlink), data (uplink and/or downlink), paging messages, etc.) to the Dual Connectivity Module 708 for processing. The antennas 716 may include multiple antennas of similar or different designs in order to sustain multiple transmission links. The RF unit 714 may configure the antennas 716.

In an aspect, the UE 700 can include multiple transceivers 710 implementing different RATs (e.g., NR and LTE). In an aspect, the UE 700 can include a single transceiver 710 implementing multiple RATs (e.g., NR and LTE). In an aspect, the transceiver 710 can include various components, where different combinations of components can implement different RATs.

Figure 8:
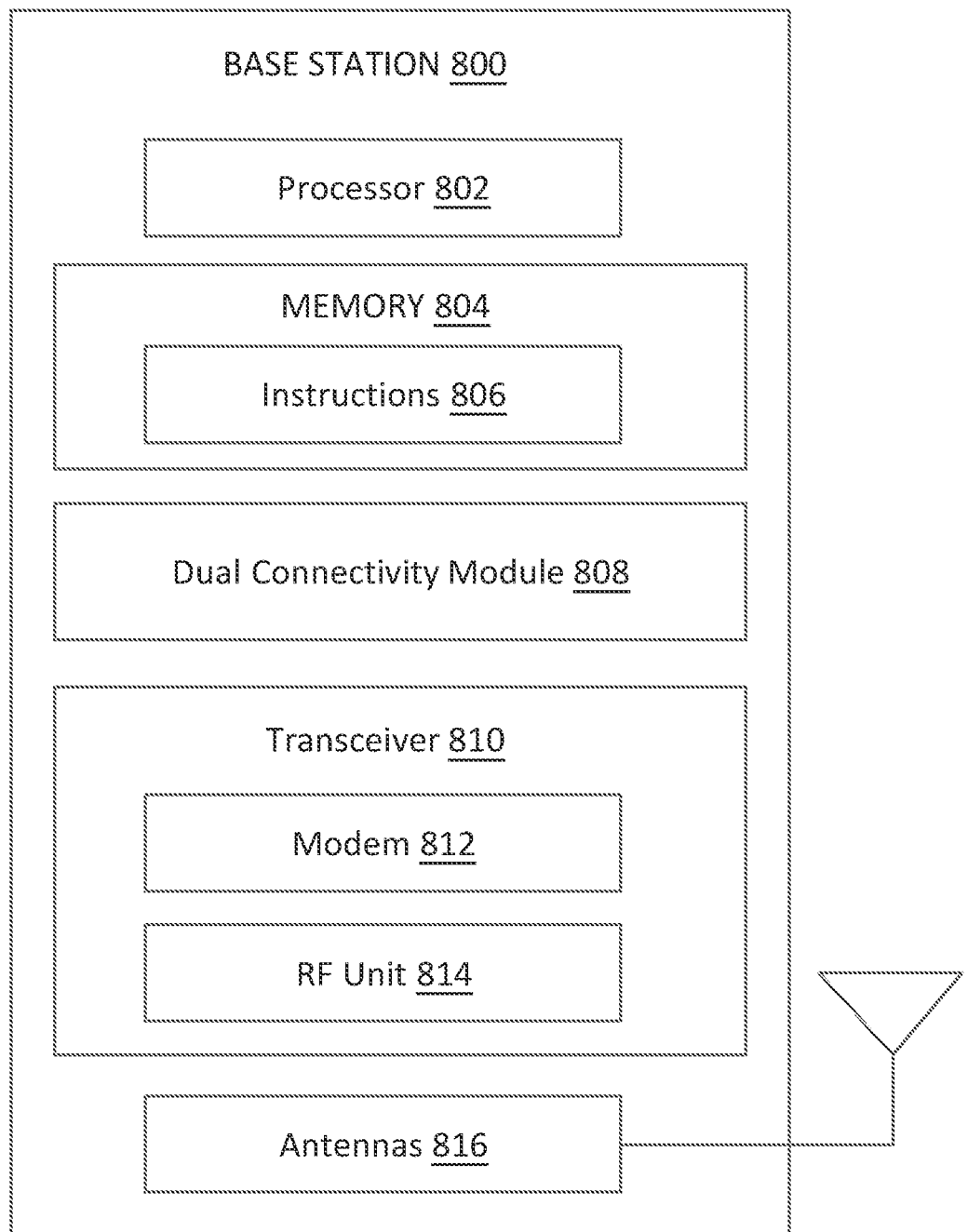
FIG. 8 is a block diagram of an exemplary base station according to some aspects of the present disclosure.

FIG. 8 is a block diagram of an exemplary BS 800 according to some aspects of the present disclosure. The BS 800 may be a BS 110 in the network 100 as discussed above in FIG. 1, or 2, or a BS 310 as discussed above in FIG. 3. A shown, the BS 800 may include a processor 802, a memory 804, a Dual Connectivity Module 808, a transceiver 810 including a modem subsystem 812 and a RF unit 814, and one or more antennas 816. These elements may be coupled with one another. The term "coupled" may refer to directly or indirectly coupled or connected to one or more intervening elements. For instance, these elements may be in direct or indirect communication with each other, for example via one or more buses.

The processor 802 may include a central processing unit (CPU), a digital signal processor (DSP), an application specific integrated circuit (ASIC), a controller, a field programmable gate array (FPGA) device, another hardware device, a firmware device, or any combination thereof configured to perform the operations described herein. The processor 802 may also be implemented as a combination of computing devices, e.g., a combination of a DSP and a microprocessor, a plurality of microprocessors, one or more microprocessors in conjunction with a DSP core, or any other such configuration.

The memory 804 may include a cache memory (e.g., a cache memory of the processor 802), random access memory (RAM), magnetoresistive RAM (MRAM), read-only memory (ROM), programmable read-only memory (PROM), erasable programmable read only memory (EPROM), electrically erasable programmable read only memory (EEPROM), flash memory, solid state memory device, hard disk drives, other forms of volatile and non-volatile memory, or a combination of different types of memory. In an aspect, the memory 804 includes a non-transitory computer-readable medium. The memory 804 may store, or have recorded thereon, instructions 806. The instructions 806 may include instructions that, when executed by the processor 802, cause the processor 802 to perform the operations described herein, for example, aspects of aspects of FIGS. 1-6. Instructions 806 may also be referred to as program code, which may be interpreted broadly to include any type of computer-readable statement(s).

The Dual Connectivity Module 808 may be implemented via hardware, software, or combinations thereof. For example, the Dual Connectivity Module 808 may be implemented as a processor, circuit, and/or instructions 806 stored in the memory 804 and executed by the processor 802. In some examples, the Dual Connectivity Module 808 can be integrated within the modem subsystem 812. For example, the Dual Connectivity Module 808 can be implemented by a combination of software components (e.g., executed by a DSP or a general processor) and hardware components (e.g., logic gates and circuitry).

In some aspects, the Dual Connectivity Module 808 is configured to transmit, to a UE on a DDS, a dual connectivity configuration. In some aspects, transmitting the dual connectivity configuration may include transmitting a radio resource control (RRC) message indicating the tune-away delay threshold. In other aspects, the Dual Connectivity Module 808 is configured to receive, from the UE on the DDS, a scheduling request. In some aspects, the scheduling request may be received in a PUCCH. For example, receiving the scheduling request may include receiving uplink control information (UCI) indicating the scheduling request. In some aspects, the Dual Connectivity Module 808 is further configured to transmit, to the UE based on the scheduling request, an UL grant. In some aspects, transmitting the UL grant may include transmitting DCI in a PDCCH indicating time/frequency resources for transmitting UL data. In some aspects, the Dual Connectivity Module 808 is further configured to receive, from the UE based on the UL grant, UL data. In some aspects, receiving the UL data includes receiving the UL data in a PUSCH resource. In some aspects, receiving the UL data includes receiving a buffer status report (BSR).

As shown, the transceiver 810 may include the modem subsystem 812 and the RF unit 814. The transceiver 810 can be configured to communicate bi-directionally with other devices, such as the UEs 120 and/or another core network element. The modem subsystem 812 may be configured to modulate and/or encode data according to a MCS, e.g., a LDPC coding scheme, a turbo coding scheme, a convolutional coding scheme, a digital beamforming scheme, etc. The RF unit 814 may be configured to process (e.g., perform analog to digital conversion or digital to analog conversion, etc.) modulated/encoded data (e.g., RRC configuration, sidelink resource pools configurations) from the modem subsystem 812 (on outbound transmissions) or of transmissions originating from another source such as a UE 120. The RF unit 814 may be further configured to perform analog beamforming in conjunction with the digital beamforming. Although shown as integrated together in transceiver 810, the modem subsystem 812 and/or the RF unit 814 may be separate devices that are coupled together at the BS 110 to enable the BS 110 to communicate with other devices.

The RF unit 814 may provide the modulated and/or processed data, e.g., data packets (or, more generally, data messages that may contain one or more data packets and other information), to the antennas 816 for transmission to one or more other devices. This may include, for example, transmission of downlink data and paging messages to a camped UE 120 according to some aspects of the present disclosure. The antennas 816 may further receive data messages transmitted from other devices and provide the received data messages for processing and/or demodulation at the transceiver 810. The transceiver 810 may provide the demodulated and decoded data to the Dual Connectivity module 808 for processing. The antennas 816 may include multiple antennas of similar or different designs in order to sustain multiple transmission links.

In an aspect, the BS 800 can include multiple transceivers 810 implementing different RATs (e.g., NR and LTE). In an aspect, the BS 800 can include a single transceiver 810 implementing multiple RATs (e.g., NR and LTE). In an aspect, the transceiver 810 can include various components, where different combinations of components can implement different RATs.

Figure 9:
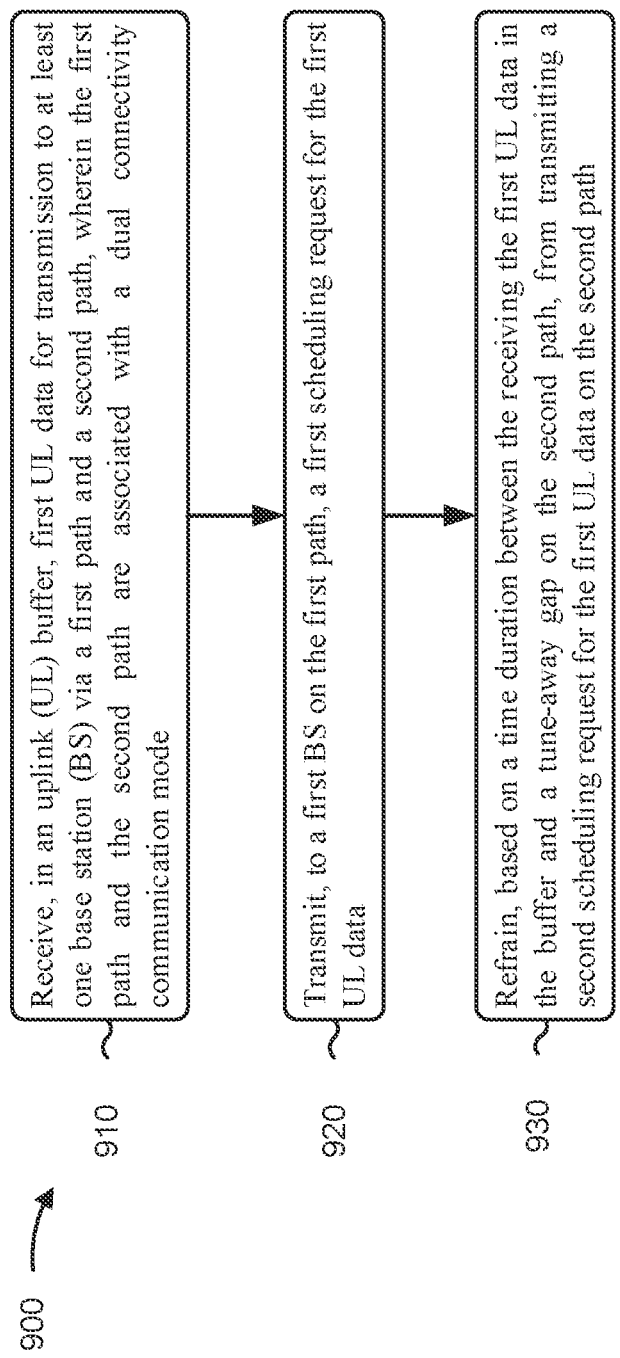
FIG. 9 is a diagram illustrating an example method performed by a user equipment, in accordance with various aspects of the present disclosure.

FIG. 9 is a flow diagram of a method 900 according to some aspects of the present disclosure. Aspects of the method 900 can be executed by a computing device (e.g., a processor, processing circuit, and/or other suitable component) of a wireless communication device or other suitable means for performing the steps. For example, a wireless communication device, such as the UE 700, may utilize one or more components, such as the processor 702, the memory 704, the Dual Connectivity Module 708, the transceiver 710, the modem 712, and the one or more antennas 716, to execute the steps of method 900. The method 900 may employ similar mechanisms as described above in FIGS. 1-6. In some aspects, the UE is an MSIM UE operating in a dual connectivity mode. For example, the UE may be configured to communicate on a dedicated data subscription (DDS) and a non-dedicated data subscription (n-DDS). Further, the MSIM UE may be configured to operate in a dual connectivity mode on at least one of the subscriptions. In one aspect, the UE is configured to operate in the dual connectivity mode on the DDS. Accordingly, the UE may communicate on a primary communication path and a secondary communication path. The communication paths may be maintained with different wireless nodes (e.g., BSs) or a same wireless node. In some aspects, the primary communication path may be referred to as a first path, and the secondary communication path may be referred to as a second path. As illustrated, the method 900 includes a number of enumerated steps, but aspects of the method 900 may include additional steps before, after, and in between the enumerated steps. In some aspects, one or more of the enumerated steps may be omitted or performed in a different order.

At block 910, the UE receives, in an uplink (UL) buffer, first UL data for transmission to at least one base station (BS) via a first path and a second path, wherein the first path and the second path are associated with a dual connectivity communication mode. The UE may compare an or volume amount of the UL buffer in the data to a threshold, such as an UL buffer threshold. For example, the UE may determine whether the UL data in the buffer exceeds a UL-DataSplit-Threshold value, or another data size threshold. The UL-DataSplitThreshold may be configured by RRC signaling. For example, the UE may receive a packet data convergence protocol (PDCP) configuration indicating one or more PDCP parameters for signaling and data radio bearers. The PDCP configuration may indicate the UL buffer threshold. The UE may be configured to transmit all UL data in the buffer on the primary path up and until the volume of the UL data exceeds the UL buffer threshold. If the volume of the UL data exceeds the threshold, the UE may be configured to trigger, or schedule, scheduling requests for both the primary path, and the secondary path. In some aspects, the UE 700 may utilize one or more components, such as the processor 702, the memory 704, the Dual Connectivity Module 708, the transceiver 710, the modem 712, and the one or more antennas 716, to execute the actions of block 910.

In some aspects, the UE determines, for each of the primary path and the secondary path, whether the DDS has a scheduled tune-away gap scheduled within x ms of receiving the data in the UL buffer. In some aspects, the value x may represent a tune-away delay threshold. Further, in some aspects, the value x may be measured in units other than ms. For example, x may be measured in slots, symbols, frames, and/or any other suitable unit of measurement. In some aspects, the UE may determine the presence of tune-away gaps. The UE may determine the presence of the tune-away gaps based on system information provided by a second network to the UE on the n-DDS. In some aspects, the UE may determine, based on the n-DDS system information, a schedule for paging occasions. The UE may determine the tune-away gaps for the DDS based on the paging occasion schedule. In other aspects, the UE may determine, based on a tune-away gap configuration for the DDS, the tune-away gap timing parameters. The tune-away gap timing parameters may include the slot format number, periodicity, length, and/or any other suitable timing configuration for the tune-away gaps.

In some aspects, the method 900 may further include determining whether the time period between receiving the UL data in the buffer and next scheduled tune-away gap exceeds the tune-away delay threshold. The tune-away delay threshold may be associated with a minimum configured delay between a scheduling request and a scheduled PUSCH, in some aspects. For example, in some aspects, the minimum delay between transmitting a scheduling request and completing a PUSCH transmission may be 8 ms for frequency division duplexing (FDD) and 10 ms for time division duplexing (TDD). In some aspects, the tune-away delay threshold may be equal to the minimum PUSCH delay for the respective duplexing mode. In other aspects, the tune-away delay threshold may be offset from the minimum PUSCH delay for the respective duplexing mode.

At block 920, the UE transmits, to a first BS on the first path, a scheduling request for the first UL data. In some aspects, transmitting the scheduling request may include transmitting uplink control information (UCI) indicating the scheduling request. Accordingly, the UE may transmit the scheduling request in a PUCCH, in some aspects. In some aspects, the UE 700 may utilize one or more components, such as the processor 702, the memory 704, the Dual Connectivity Module 708, the transceiver 710, the modem 712, and the one or more antennas 716, to execute the actions of block 920.

At block 930, the UE refrains, based on a time duration between the receiving the first UL data in the buffer and a tune-away gap on the second path, from transmitting a second scheduling request for the first UL data on the second path, a scheduling request on the second path. The UE may refrain from transmitting the scheduling request based on a time between receiving the UL data in the buffer and the scheduled tune-away being less than the tune-away delay threshold described above. In some aspects, the UE 700 may utilize one or more components, such as the processor 702, the memory 704, the Dual Connectivity Module 708, the transceiver 710, the modem 712, and the one or more antennas 716, to execute the actions of block 930.

In some aspects, the network (e.g., nodeB/core network), upon receiving the scheduling request, transmits an UL grant to the UE on the primary path. Transmitting the UL grant may include transmitting downlink control information (DCI) in PDCCH for the first path. The UL grant may indicate time/frequency resources for the first path for transmitting at least a portion of the UL data. Based on the UL grant, the UE may transmit, on the first path, a BSR indicating a volume of UL data in the buffer. In some aspects, transmitting the BSR includes transmitting a media access control-control element (MAC-CE) in a PUSCH, where the MAC-CE includes or indicate the buffer status. In some aspects, the UE may also transmit at least a portion of the UL data with the BSR. Based on the BSR, the network may transmit, to the UE via the first BS, an additional UL grant indicating UL resources based on the BSR. In some aspects, the network may determine the amount of UL resources for the additional UL grant based on the BSR.

Further, the method 900 may include the UE transmitting additional UL data in the UL resources indicated in the additional UL grant. In some aspects, the UE transmits the UL data in a PUSCH. In some aspects, the UE may transmit an entirety of the UL data in the buffer to the network via the first BS. In other aspects, the UE may transmit only a portion of the UL data to the network.

In some aspects, the method 900 further includes the UE performing a page monitoring procedure for the n-DDS. The page monitoring procedure may result in a tune-away gap for the DDS. In some aspects, performing the page monitoring procedure may include performing a blind decoding operation in one or more page monitoring occasions and/or PDCCH monitoring occasions. In some aspects, performing the page monitoring procedure includes the UE attempting to decode data on the n-DDS scrambled with a P-RNTI in a PDCCH occasion. In some aspects, the method 900 includes the UE tuning the DDS away to accommodate the paging occasion. In some aspects, tuning the DDS away may cause the secondary path to experience an outage of receiving and/or transmitting capability due to baseband resource conflicts with the n-DDS.

The method 900 may further include the UE transmitting, following the tune-away gap on the second path, the second scheduling request. The UE may transmit the second scheduling request to a second BS different from the first BS. For example, the second BS and the first BS may be associated with different RATs (e.g., NSA mode, LTE and NR). In other aspects, the first BS and the second BS are associated with a same RAT (e.g., SA mode, NR and NR). In other aspects, the UE may transmit the second scheduling request to the first BS. The network (e.g., nodeB/core network), upon receiving the second scheduling request, may transmit a second UL grant to the UE on the second path. Transmitting the second UL grant may include transmitting downlink control information (DCI) in PDCCH for the second path. The UL grant may indicate time/frequency resources on the second path for transmitting at least a portion of the UL data.

In some aspects, the method 900 further includes the UE transmitting, to the second BS, a remaining portion of the UL data in the UL resources indicated in the second UL grant. In some aspects, the UE transmits the UL data in a PUSCH. In some aspects, the UE may transmit, on the second path, a BSR with a portion of the UL data associated with the UL grant. In some aspects, the network may determine, based on the BSR, a further UL grant for communicating the remaining UL data in the UL buffer.

Figure 10:
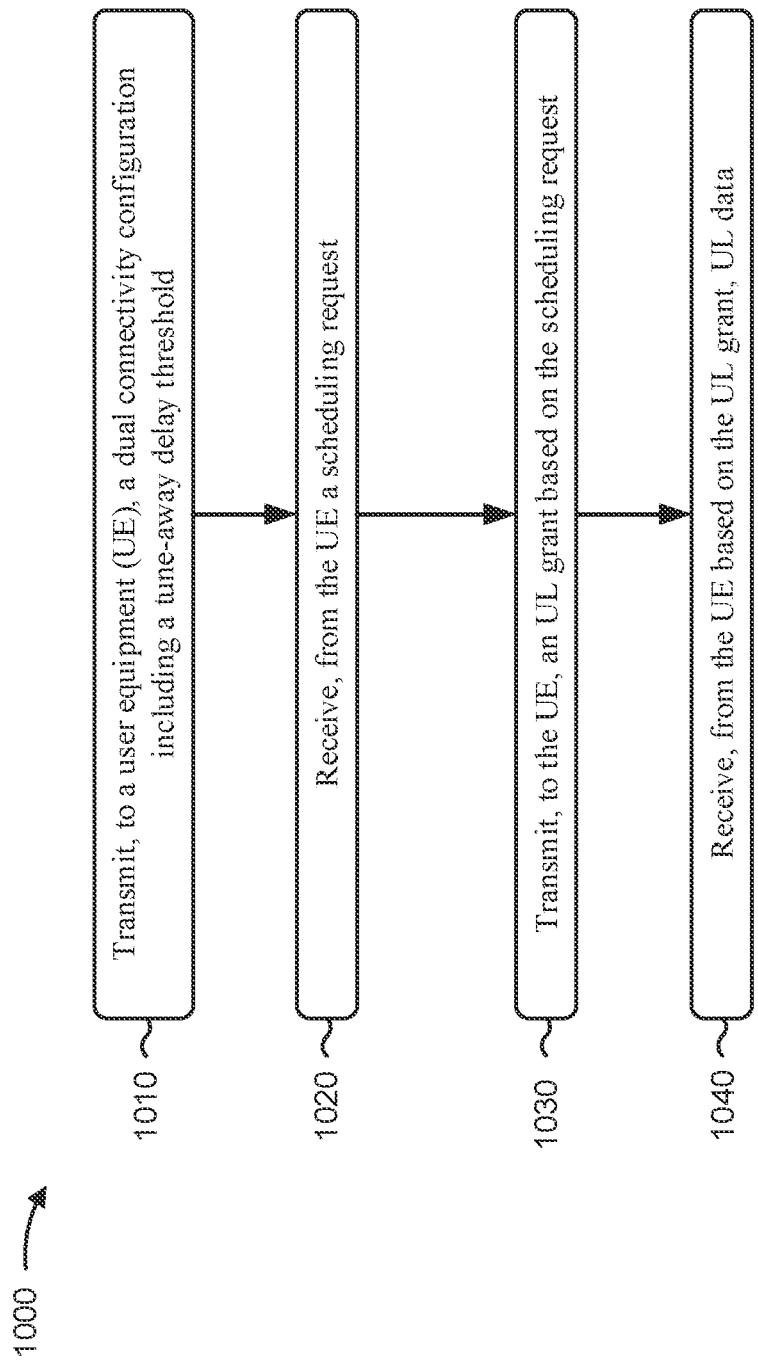
FIG. 10 is a diagram illustrating an example method performed by a base station, in accordance with various aspects of the present disclosure.

FIG. 10 is a flow diagram of a method 1000 according to some aspects of the present disclosure. Aspects of the method 1000 can be executed by a computing device (e.g., a processor, processing circuit, and/or other suitable component) of a wireless communication device or other suitable means for performing the steps. For example, a wireless communication device, such as the BS 800, may utilize one or more components, such as the processor 802, the memory 804, the Dual Connectivity Module 808, the transceiver 810, the modem 812, and the one or more antennas 816, to execute the steps of method 1000. The method 1000 may employ similar mechanisms as described above in FIGS. 1-6. In some aspects, the BS may be associated with a network and a radio access technology (RAT), such as LTE, 5G NR, or any other suitable RAT. In some aspects, the network may be configured to operate in a standalone (SA) mode, or a non-standalone (NSA) mode. As illustrated, the method 1000 includes a number of enumerated steps, but aspects of the method 1000 may include additional steps before, after, and in between the enumerated steps. In some aspects, one or more of the enumerated steps may be omitted or performed in a different order.

At block 1010, the BS transmits, to a UE on a DDS, a dual connectivity configuration. In some aspects, transmitting the dual connectivity configuration may include transmitting a radio resource control (RRC) message indicating the tune-away delay threshold. In other aspects, transmitting the dual connectivity configuration may include transmitting a media access control-control element (MAC-CE) indicating the tune-away delay threshold. In some aspects, the tune-away delay threshold may indicate a time duration in ms, frames, slots, symbols, and/or any suitable unit of time. The UE may be configured to determine whether to refrain from transmitting a scheduling request on one or more communication paths based on the configured tune-away delay threshold. In some aspects, the BS 800 may utilize one or more components, such as the processor 802, the memory 804, the Dual Connectivity Module 808, the transceiver 810, the modem 812, and the one or more antennas 816, to execute the actions of block 1010.

At block 1020, the BS receives, from the UE on the DDS, a scheduling request. In some aspects, the scheduling request may be received in a PUCCH. For example, receiving the scheduling request may include receiving uplink control information (UCI) indicating the scheduling request. In this regard, the BS receive the scheduling request by performing a blind decoding operation in the PUCCH. The PUCCH resources may be periodic and assigned to the UE. Accordingly, the BS may implicitly determine the identity of the UE based on the PUCCH in which the scheduling request was received. In some aspects, the BS 800 may utilize one or more components, such as the processor 802, the memory 804, the Dual Connectivity Module 808, the transceiver 810, the modem 812, and the one or more antennas 816, to execute the actions of block 1020.

At block 1030, the BS transmits, to the UE based on the scheduling request, an UL grant. In some aspects, transmitting the UL grant may include transmitting DCI in a PDCCH indicating time/frequency resources for transmitting UL data. In some aspects, the BS 800 may utilize one or more components, such as the processor 802, the memory 804, the Dual Connectivity Module 808, the transceiver 810, the modem 812, and the one or more antennas 816, to execute the actions of block 1030.

At block 1040, the BS receives, from the UE based on the UL grant, UL data. In some aspects, receiving the UL data includes receiving the UL data in a PUSCH resource. In some aspects, receiving the UL data includes receiving a buffer status report (BSR). For example, the UL data may include, in a PUSCH, a MAC-CE including the BSR. In some aspects, the BS may use the BSR to determine an additional UL grant. The BS may transmit the additional UL grant for the UE to transmit remaining UL data in a UL buffer. In some aspects, the BS 800 may utilize one or more components, such as the processor 802, the memory 804, the Dual Connectivity Module 808, the transceiver 810, the modem 812, and the one or more antennas 816, to execute the actions of block 1040.

Recitations of Various Aspects of the Present Disclosure

Aspect 1. A method of wireless communication performed by a user equipment (UE), the method comprising: receiving, in an uplink (UL) buffer, first UL data for transmission to at least one base station (BS) via a first path and a second path, wherein the first path and the second path are associated with a dual connectivity communication mode; transmitting, to a first BS on the first path, a first scheduling request for the first UL data; and refraining, based on a time duration between the receiving the first UL data in the buffer and a tune-away gap on the second path, from transmitting a second scheduling request for the first UL data on the second path.

Aspect 2. The method of aspect 1, wherein: the transmitting the first scheduling request comprises transmitting the first scheduling request on a dedicated data subscription (DDS); and the tune-away gap is associated with a non-dedicated data subscription (n-DDS).

Aspect 3. The method of any of aspects 1-2, wherein: the first path is associated with a first radio access technology (RAT); and the second path is associated with a second RAT.

Aspect 4. The method of any of aspects 1-2, wherein the first path and the second path are associated with a same radio access technology (RAT).

Aspect 5. The method of any of aspects 1-4, wherein the refraining from transmitting the second scheduling request is further based on a buffer threshold.

Aspect 6. The method of any of aspects 1-5, further comprising: receiving, based on the first scheduling request, a first UL grant on the first path; and transmitting, to the first BS based on the first UL grant, a buffer status report indicating an amount of the first UL data.

Aspect 7. The method of aspect 6, further comprising: receiving, from the first BS based on the buffer status report, a second UL grant for the first UL data; and transmitting, to the first BS on the first path, the first UL data.

Aspect 8. The method of any of aspects 1-7, further comprising: transmitting, on the second path to a second BS after the tune-away gap, a third scheduling request for the first UL data.

Aspect 9. The method of aspect 8, further comprising: receiving, from the second BS based on the third scheduling request, a third UL grant for the first UL data; and transmitting, to the second BS on the second path, the first UL data.

Aspect 10. The method of any of aspects 1-9, wherein the refraining from transmitting the second scheduling request is based on the time duration being lower than a threshold.

Aspect 11. The method of aspect 10, wherein the threshold is based on a duplexing configuration of the UE.

Aspect 12. A user equipment (UE) comprising a memory; a transceiver; and a processor operatively coupled to the memory and the transceiver and configured to perform the actions of any of aspects 1-12.

Aspect 13. An apparatus for use by a user equipment (UE) comprising: a processor and a memory configured to: obtain, in an uplink (UL) buffer, first UL data for transmission to at least one base station (BS) via a first path and a second path, wherein the first path and the second path are associated with a dual connectivity communication mode; provide for transmission, on the first path, a first scheduling request for the first UL data; and refrain, based on a time duration between the receiving the first UL data in the buffer and a tune-away gap on the second path, from providing for transmission a second scheduling request for the first UL data on the second path.

Aspect 14. A non-transitory, computer-readable medium having program code recorded thereon, the program code being executable by a user equipment (UE) and including code for causing the UE to: receive, in an uplink (UL) buffer, first UL data for transmission to at least one base station (BS) via a first path and a second path, wherein the first path and the second path are associated with a dual connectivity communication mode; transmit, to a first BS on the first path, a first scheduling request for the first UL data; and refrain, based on a time duration between the receiving the first UL data in the buffer and a tune-away gap on the second path, from transmitting a second scheduling request for the first UL data on the second path.

Aspect 15. A user equipment (UE) comprising: means for receiving, in an uplink (UL) buffer, first UL data for transmission to at least one base station (BS) via a first path and a second path, wherein the first path and the second path are associated with a dual connectivity communication mode; means for transmitting, to a first BS on the first path, a first scheduling request for the first UL data; and means for refraining, based on a time duration between the receiving the first UL data in the buffer and a tune-away gap on the second path, from transmitting a second scheduling request for the first UL data on the second path.

The foregoing disclosure provides illustration and description, but is not intended to be exhaustive or to limit the aspects to the precise form disclosed. Modifications and variations may be made in light of the above disclosure or may be acquired from practice of the aspects.

As used herein, the term "component" is intended to be broadly construed as hardware, firmware, and/or a combination of hardware and software. As used herein, a processor is implemented in hardware, firmware, and/or a combination of hardware and software.

As used herein, satisfying a threshold may, depending on the context, refer to a value being greater than the threshold, greater than or equal to the threshold, less than the threshold, less than or equal to the threshold, equal to the threshold, not equal to the threshold, and/or the like.

It will be apparent that systems and/or methods described herein may be implemented in different forms of hardware, firmware, and/or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. A phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as essential unless explicitly described as such. Also, as used herein, the articles "a" and "an" are intended to include one or more items, and may be used interchangeably with "one or more." Furthermore, as used herein, the terms "set" and "group" are intended to include one or more items (e.g., related items, unrelated items, a combination of related and unrelated items, and/or the like), and may be used interchangeably with "one or more." Where only one item is intended, the phrase "only one" or similar language is used. Also, as used herein, the terms "has," "have," "having," and/or the like are intended to be open-ended terms. Further, the phrase "based on" is intended to mean "based, at least in part, on" unless explicitly stated otherwise.

What is claimed is:

1. A method of wireless communication performed by a user equipment (UE), the method comprising:
   receiving, in an uplink (UL) buffer, first UL data for transmission to at least one base station (BS) via a first path and a second path, wherein the first path and the second path are associated with a dual connectivity communication mode;
   transmitting, to a first BS on the first path, a first scheduling request for a first portion of the first UL data at a first time;
   refraining, based on a time duration between the receiving the first UL data in the buffer and a tune-away gap on the second path, from transmitting a second scheduling request at the first time for the first UL data on the second path, the second scheduling request associated with a second portion of the first UL data; and
   transmitting, to a second BS on the second path at a second time after the tune-away gap, a third scheduling request for the second portion of the first UL data.

2. The method of claim 1, wherein:
   the transmitting the first scheduling request comprises transmitting the first scheduling request on a dedicated data subscription (DDS); and
   the tune-away gap is associated with a non-dedicated data subscription (n-DDS).

3. The method of claim 1, wherein:
   the first path is associated with a first radio access technology (RAT); and
   the second path is associated with a second RAT.

4. The method of claim 1, wherein the first path and the second path are associated with a same radio access technology (RAT).

5. The method of claim 1, wherein the refraining from transmitting the second scheduling request is further based on a buffer threshold.

6. The method of claim 1, further comprising:
   receiving, based on the first scheduling request, a first UL grant on the first path; and
   transmitting, to the first BS based on the first UL grant, a buffer status report indicating an amount of the first UL data.

7. The method of claim 6, further comprising:
   receiving, from the first BS based on the buffer status report, a second UL grant for the first portion of the first UL data; and
   transmitting, to the first BS on the first path, the first portion of the first UL data.

8. The method of claim 1, further comprising:
   receiving, from the second BS based on the third scheduling request, a third UL grant for the second portion of the first UL data; and
   transmitting, to the second BS on the second path, the second portion of the first UL data.

9. The method of claim 1, wherein the refraining from transmitting the second scheduling request is based on the time duration being lower than a threshold.

10. The method of claim 9, wherein the threshold is based on a duplexing configuration of the UE.

11. A user equipment (UE), comprising:
   a memory;
   a transceiver; and
   at least one processor operatively coupled to the memory, wherein the UE is configured to:

receive, in an uplink (UL) buffer, first UL data for transmission to at least one base station (BS) via a first path and a second path, wherein the first path and the second path are associated with a dual connectivity communication mode;

transmit, to a first BS on the first path, a first scheduling request for a first portion of the first UL data at a first time;

refrain, based on a time duration between the receiving the first UL data in the buffer and a tune-away gap on the second path, from transmitting a second scheduling request at the first time for the first UL data on the second path, the second scheduling request associated with a second portion of the first UL data; and transmit, to a second BS on the second path at a second time after the tune-away gap, a third scheduling request for the second portion of the first UL data.

12. The UE of claim 11, wherein:
the UE is configured to transmit, the first scheduling request on a dedicated data subscription (DDS); and
the tune-away gap is associated with a non-dedicated data subscription (n-DDS).

13. The UE of claim 11, wherein:
the first path is associated with a first radio access technology (RAT); and
the second path is associated with a second RAT.

14. The UE of claim 11, wherein the first path and the second path are associated with a same radio access technology (RAT).

15. The UE of claim 11, wherein the UE is configured to refrain from transmitting the second scheduling request further based on a buffer threshold.

16. The UE of claim 11, wherein the UE is further configured to:
receive, based on the first scheduling request, a first UL grant on the first path; and
transmit, to the first BS based on the first UL grant, a buffer status report indicating an amount of the first UL data.

17. The UE of claim 16, wherein the UE is further configured to:
receive, from the first BS based on the buffer status report, a second UL grant for the first portion of the first UL data; and
transmit, to the first BS on the first path, the first portion of the first UL data.

18. The UE of claim 11, wherein the UE is further configured to:
receive, from the second BS based on the third scheduling request, a third UL grant for the second portion of the first UL data; and
transmit, to the second BS on the second path, the second portion of the first UL data.

19. The UE of claim 11, wherein the UE is configured to refrain from transmitting the second scheduling request based on the time duration being lower than a threshold.

20. The UE of claim 19, wherein the threshold is based on a duplexing configuration of the UE.

21. A non-transitory, computer readable medium having program code recorded thereon, wherein the program code is executable by a user equipment (UE) and comprises code for causing the UE to:
receive, in an uplink (UL) buffer, first UL data for transmission to at least one base station (BS) via a first path and a second path, wherein the first path and the second path are associated with a dual connectivity communication mode;

transmit, to a first BS on the first path, a first scheduling request for a first portion of the first UL data at a first time;

refrain, based on a time duration between the receiving the first UL data in the buffer and a tune-away gap on the second path, from transmitting a second scheduling request at the first time for the first UL data on the second path, the second scheduling request associated with a second portion of the first UL data; and transmit, to a second BS on the second path at a second time after the tune-away gap, a third scheduling request for the second portion of the first UL data.

22. The non-transitory, computer readable medium of claim 21, wherein:
the code for causing the UE to transmit the first scheduling request comprises code for causing the UE to transmit first scheduling request on a dedicated data subscription (DDS); and
the tune-away gap is associated with a non-dedicated data subscription (n-DDS).

23. The non-transitory, computer readable medium of claim 21, wherein the code for causing the UE to refrain from transmitting the second scheduling request is further based on a buffer threshold.

24. The non-transitory, computer readable medium of claim 21, wherein the program code further comprises code for causing the UE to:
receive, based on the first scheduling request, a first UL grant on the first path; and
transmit, to the first BS based on the first UL grant, a buffer status report indicating an amount of the first UL data.

25. The non-transitory, computer readable medium of claim 24, wherein the program code further comprises code for causing the UE to:
receive, from the first BS based on the buffer status report, a second UL grant for the first UL data; and
transmit, to the first BS on the first path, the first UL data.

26. The non-transitory, computer readable medium of claim 21, wherein the code for causing the UE to refrain from transmitting the second scheduling request is based on the time duration being lower than a threshold.

27. The non-transitory, computer readable medium of claim 26, wherein the threshold is based on a duplexing configuration of the UE.

28. A user equipment (UE), comprising:
means for receiving, in an uplink (UL) buffer, first UL data for transmission to at least one base station (BS) via a first path and a second path, wherein the first path and the second path are associated with a dual connectivity communication mode;
means for transmitting, to a first BS on the first path, a first scheduling request for a first portion of the first UL data at a first time;
means for refraining, based on a time duration between the receiving the first UL data in the buffer and a tune-away gap on the second path, from transmitting a second scheduling request at the first time for the first UL data on the second path, the second scheduling request associated with a second portion of the first UL data; and
means for transmitting, to a second BS on the second path at a second time after the tune- away gap, a third scheduling request for the second portion of the first UL data.

* * * * *